(12) United States Patent
Fukuzawa et al.

(10) Patent No.: US 6,327,353 B1
(45) Date of Patent: Dec. 4, 2001

(54) APPARATUS AND METHOD FOR PERMITTING TEMPORARY USE OF A TELEPHONE NUMBER

(75) Inventors: Yohji Fukuzawa; Toshihiro Morikawa; Hirofumi Mitome, all of Fukuoka (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/173,385

(22) Filed: Oct. 15, 1998

(30) Foreign Application Priority Data

Jun. 4, 1998 (JP) .................................. 10-155494

(51) Int. Cl.[7] .................................................. H04M 1/56
(52) U.S. Cl. ............................. 379/201.01; 379/211.01; 379/211.02; 379/212.01
(58) Field of Search ..................... 379/210, 211, 379/201, 212, 221, 210.01, 211.01, 211.02, 212.01, 201.01, 201.02, 201.11, 201.04, 221.01, 221.06, 221.08, 213.01

(56) References Cited

U.S. PATENT DOCUMENTS

| | | | |
|---|---|---|---|
| 5,404,396 | * 4/1995 | Brennan | 379/201 |
| 5,588,051 | * 12/1996 | Berkowitz et al. | 379/243 |
| 5,590,184 | * 12/1996 | London | 379/142 |
| 5,822,411 | * 10/1998 | Swale et al. | 379/111 |
| 5,838,779 | * 11/1998 | Fuller et al. | 379/211 |
| 5,907,602 | * 5/1999 | Peel et al. | 379/114 |

FOREIGN PATENT DOCUMENTS

| | | |
|---|---|---|
| 60-27261 | 2/1985 | (JP) . |
| 62-294365 | 12/1987 | (JP) . |
| 2-119362 | 5/1990 | (JP) . |
| 3-7459 | 1/1991 | (JP) . |
| 3-85091 | 4/1991 | (JP) . |
| 5-76060 | 3/1993 | (JP) . |
| 5-344551 | 12/1993 | (JP) . |
| 6125392 | 5/1994 | (JP) . |
| 6-165247 | 6/1994 | (JP) . |
| 9-307962 | 11/1997 | (JP) . |

\* cited by examiner

Primary Examiner—Ahmad Matar
Assistant Examiner—William J. Deane, Jr.

(57) ABSTRACT

An apparatus and method for permitting temporary use of a telephone number which promptly permit temporary use of a different telephone number without requiring a telephone installation fee. Virtual telephone number notification unit assigns a virtual telephone number to a subscriber terminal at the request of the subscriber terminal, and virtual telephone number registration unit registers the thus-assigned virtual telephone number in association with connection information on the subscriber terminal. In response to call initiation by another subscriber terminal by means of the virtual telephone number, call connection unit refers to the virtual telephone number registration unit to read out the connection information associated with the virtual telephone number and, based on the connection information, connects the calling subscriber terminal to the first-mentioned subscriber terminal.

12 Claims, 19 Drawing Sheets

APPARATUS AND METHOD FOR PERMITTING TEMPORARY USE OF A TELEPHONE NUMBER

BACKGROUND OF THE INVENTION (1) Field of the Invention

The present invention relates to an apparatus and method for permitting temporary use of a telephone number, and more particularly, to an apparatus and method for permitting temporary use of a telephone number to temporarily enable a subscriber terminal to have telephone communication by using a telephone number other than that assigned thereto.

(2) Description of the Related Art

Conventionally, in cases where a subscriber is forced to receive a telephone call from persons whom the subscriber wishes to leave uninformed of his or her telephone number, for example, where the subscriber is obliged to indicate his/her telephone number for contact on a public message board such as for purposes of private sale, invitation to group activities or request for search for a lost article or where the subscriber allows another person to temporarily use his/her telephone for contact, the subscriber is left only two options: to install a new telephone to acquire a different telephone number or to let others know his/her own telephone number.

In the case of installing a new telephone to acquire a different telephone number, however, a high installation fee is required, and also the procedures needed from the application for installation to actual registration and the procedures for cancellation of the registration because of disuse of the telephone require much time.

SUMMARY OF THE INVENTION

An object of the present invention is to provide an apparatus and method for permitting temporary use of a telephone number, which apparatus and method require no installation fee and promptly permit temporary use of a different telephone number.

Herein, the phrase "virtual telephone number" is interchangeable with the phrase "temporary telephone number."

To achieve the above object, there is provided an apparatus for permitting temporary use of a telephone number to temporarily enable a subscriber terminal to have telephone communication by using a telephone number other than that assigned thereto. The apparatus comprises virtual telephone number notification unit, responsive to a request from a first subscriber terminal to assign thereto a virtual telephone number which is a telephone number permitting temporary use, for assigning a virtual telephone number to the first subscriber terminal and notifying the first subscriber terminal of the assigned virtual telephone number, virtual telephone number registration unit for registering the virtual telephone number assigned to the first subscriber terminal in association with connection information on the first subscriber terminal, and call connection unit, responsive to a call request from a second subscriber terminal by means of a virtual telephone number, for referring to the virtual telephone number registration unit to read out connection information associated with the requested virtual telephone number and connecting the second subscriber terminal to a subscriber terminal with which the connection information is associated.

To achieve the above object, there is also provided a method for use in an apparatus for permitting temporary use of a telephone number to temporarily enable a subscriber terminal to have telephone communication by using a telephone number other than that assigned thereto. The method comprises the step of receiving a request from a subscriber terminal to assign thereto a virtual telephone number and assigning the subscriber terminal a new virtual telephone number other than a telephone number already assigned thereto, and the step of performing a call connection process by using the virtual telephone number when a connection process for connecting a call to the subscriber terminal is requested.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described with reference to the drawings.

Figure 1:
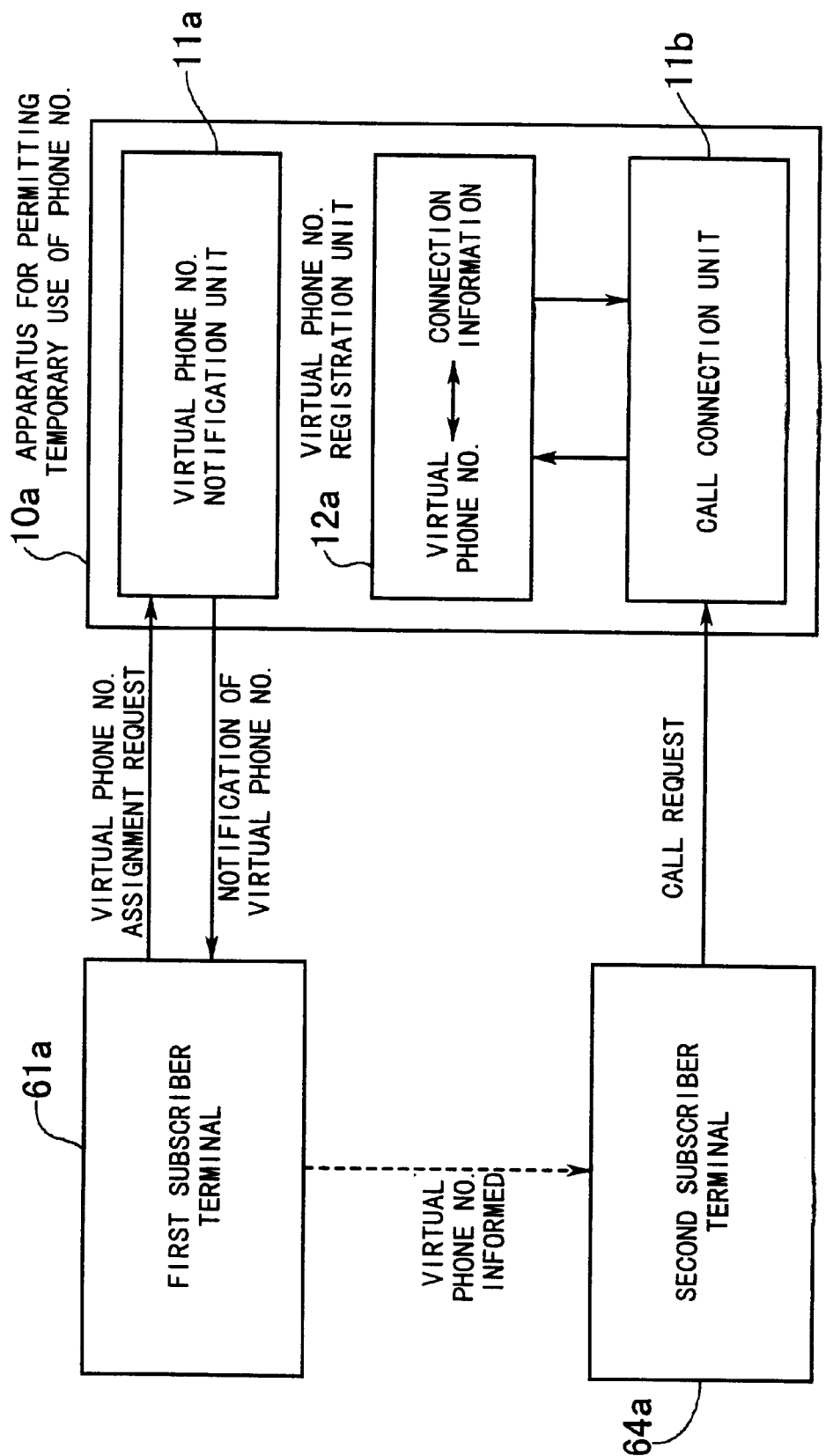
FIG. 1 is a diagram illustrating the principles of the present invention.

Referring first to FIG. 1, a theoretical configuration according to a first embodiment will be described. The first embodiment comprises virtual telephone number notification unit 11a, responsive to a request from a first subscriber terminal 61a to assign thereto a virtual telephone number which is a telephone number permitting temporary use, for assigning a virtual telephone number to the first subscriber terminal 61a and notifying the first subscriber terminal 61a of the assigned virtual telephone number, virtual telephone number registration unit 12a for registering the virtual telephone number assigned to the first subscriber terminal 61a in association with connection information on the first subscriber terminal 61a, and call connection unit 11b, responsive to a call request from a second subscriber terminal 64a by means of a virtual telephone number, for referring to the virtual telephone number registration unit 12a to read out connection information associated with the requested virtual telephone number and connecting the second subscriber terminal 64a to a subscriber terminal with which the connection information is associated.

In the configuration described above, an apparatus 10a for permitting temporary use of a telephone number is in general incorporated in an exchange, and the first and second subscriber terminals 61a and 64a are connected to the apparatus 10a. The first subscriber terminal 61a transmits a virtual telephone number assignment request to the apparatus 10a so that it may be permitted temporary use of a telephone number (virtual telephone number) other than that originally assigned thereto.

On receiving the request, the virtual telephone number notification unit 11a searches for an idle virtual telephone number. If an idle virtual telephone number exists, the virtual telephone number notification unit 11a assigns it to the first subscriber terminal 61a and notifies the terminal 61a of the virtual telephone number thus assigned. Simultaneously, the virtual telephone number registration unit 12a of the apparatus 10a registers the virtual telephone number, which has been assigned to the first subscriber terminal 61a, in association with the connection information on the first subscriber terminal 61a. The connection information is information which indicates a subscriber terminal assignment location.

Let it be assumed that the operator of the second subscriber terminal 64a is informed of the virtual telephone number assigned to the first subscriber terminal 61a by the operator of the latter terminal 61a, and that using this virtual telephone number, a call request is transmitted from the second subscriber terminal 64a to the apparatus 10a for permitting temporary use of a telephone number. In this case, the call connection unit 11b of the apparatus 10a refers to the virtual telephone number registration unit 12a to read out the connection information associated with the requested virtual telephone number. The information read out in this case is the connection information on the first subscriber terminal 61a. Then, based on the connection information, the call connection unit 11b connects the second subscriber terminal 64a to the first subscriber terminal 61a.

Thus, it is possible to acquire a different telephone number automatically without the need to install a new telephone; therefore, no installation fee is required and temporary use of a different telephone number is permitted without delay.

The first embodiment will be now described in more detail. In the following description of the first embodiment, the apparatus 10a for permitting temporary use of a telephone number, shown in FIG. 1, corresponds to a centralized management station 10 in FIG. 2. Similarly, the first subscriber terminal 61a corresponds to a subscriber terminal 61, the second subscriber terminal 64a corresponds to a subscriber terminal 64, the virtual telephone number notification unit 11a and the call connection unit 11b correspond to a central control unit 11, and the virtual telephone number registration unit 12a corresponds to a memory 12.

Figure 2:
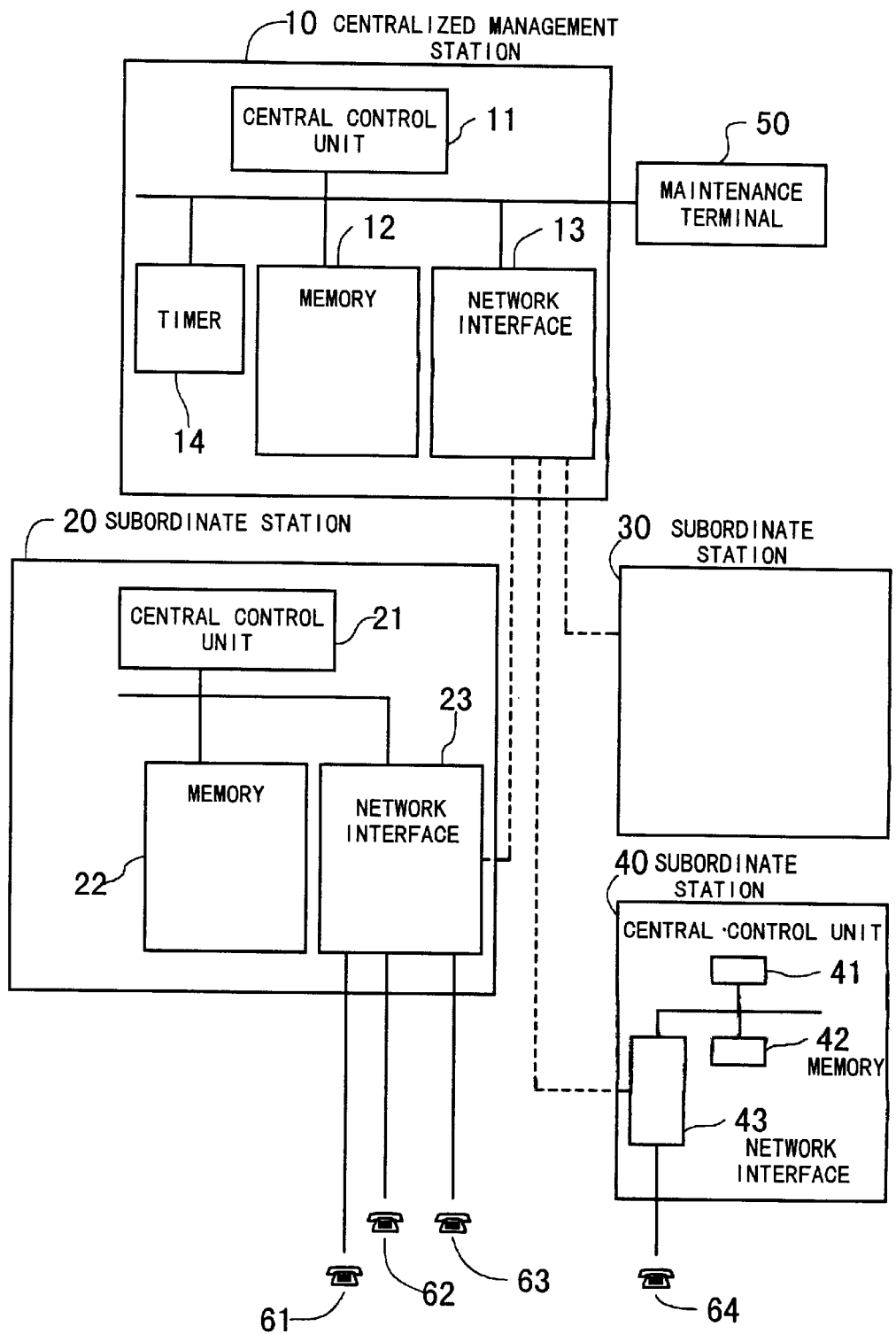
FIG. 2 is a block diagram showing an example of network configuration.

FIG. 2 shows an example of network configuration. In the network illustrated in FIG.2, subordinate stations 20, 30 and 40 are connected to the centralized management station 10, and also a maintenance terminal 50 is connected to the station 10. Subscriber terminals 61, 62 and 63 are connected to the subordinate station 20, and a subscriber terminal 64 is connected to the subordinate station 40. Subscriber terminals are connected also to the subordinate station 30. In practice, a greater number of subscriber terminals than illustrated are connected to each subordinate station but are omitted from the figure. Each subscriber terminal comprises a telephone.

The centralized management station 10, which is an exchange, includes therein a central control unit 11, a memory 12, a network interface 13, and a timer 14. The subordinate station 20 also includes therein a central control unit 21, a memory 22, and a network interface 23. The subordinate stations 30 and 40 are identical in internal arrangement with the subordinate station 20. The centralized management station 10 and the individual subordinate stations 20, 30 and 40 are connected via the respective network interfaces incorporated therein.

Figure 3:
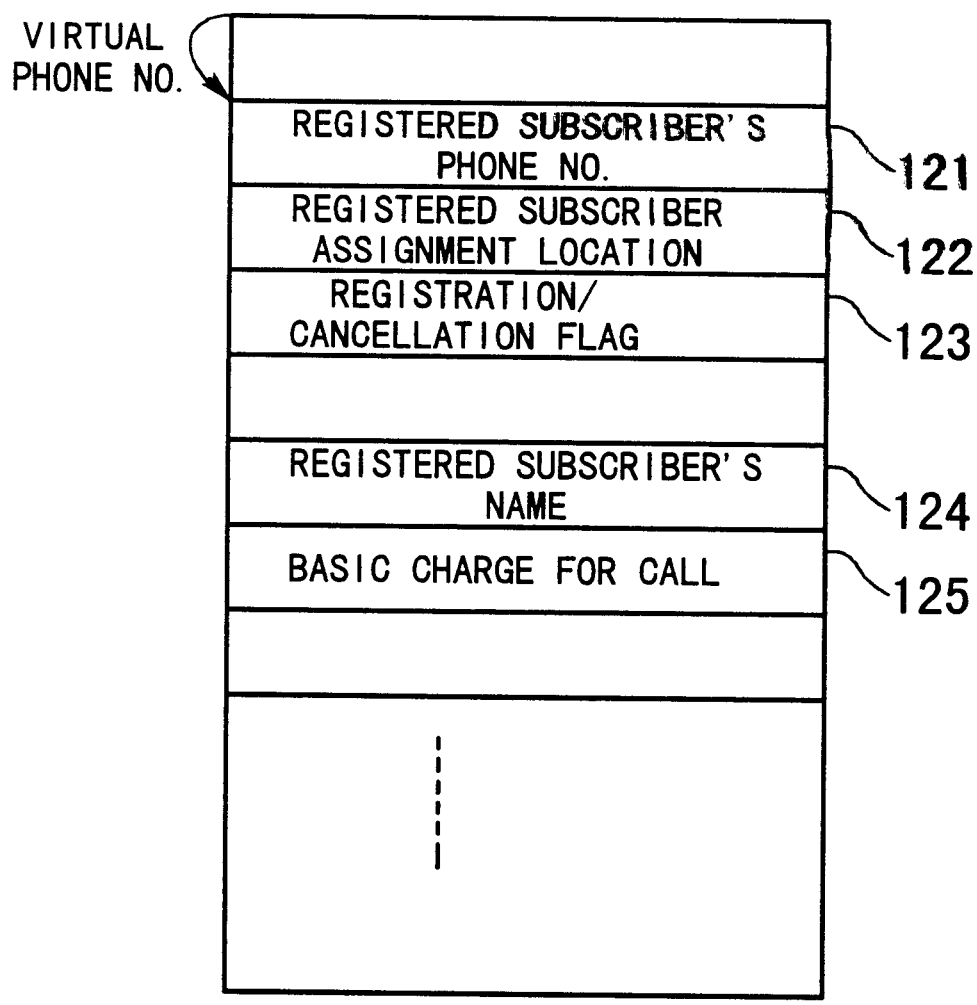
FIG. 3 is a diagram showing contents of virtual telephone number data stored in memory in a centralized management station.

FIG. 3 shows the contents of virtual telephone; number data stored in the memory 12 of the centralized management station 10. The memory 12 stores, with respect to each virtual telephone number, information on the subscriber terminal to which a virtual telephone number has been assigned. Specifically, the subscriber terminal, information includes a "REGISTERED SUBSCRIBER'S PHONE NO." field 121 describing therein the original telephone number of the subscriber terminal to which the corresponding virtual telephone number has been assigned, a "REGISTERED SUBSCRIBER ASSIGNMENT LOCATION" field 122 describing therein the identification name of a subordinate station to which the subscriber terminal having the corresponding virtual telephone number assigned thereto is connected and the port number in the subordinate station to which the subscriber terminal is connected, a "REGISTRATION/CANCELLATION FLAG" field 123 describing therein a flag which indicates whether the corresponding virtual telephone number is already assigned to the subscriber terminal, a "REGISTERED SUBSCRIBER'S NAME" field 124 describing therein the name of the subscriber who owns the subscriber terminal to which the corresponding virtual telephone number has been assigned, and a "BASIC CHARGE FOR CALL" field 125 describing therein a basic charge applicable when a call is established with respect to the subscriber terminal to which the corresponding virtual telephone number has been assigned.

In the following, the operations of the centralized management station 10 and the subordinate stations 20, 30 and 40 will be explained with reference, by way of example, to the case where the subscriber terminal 61 has a virtual telephone number registered in the centralized management station 10 and the subscriber terminal 64 thereafter makes a call by using the virtual telephone number assigned to the subscriber terminal 61.

Figure 4:
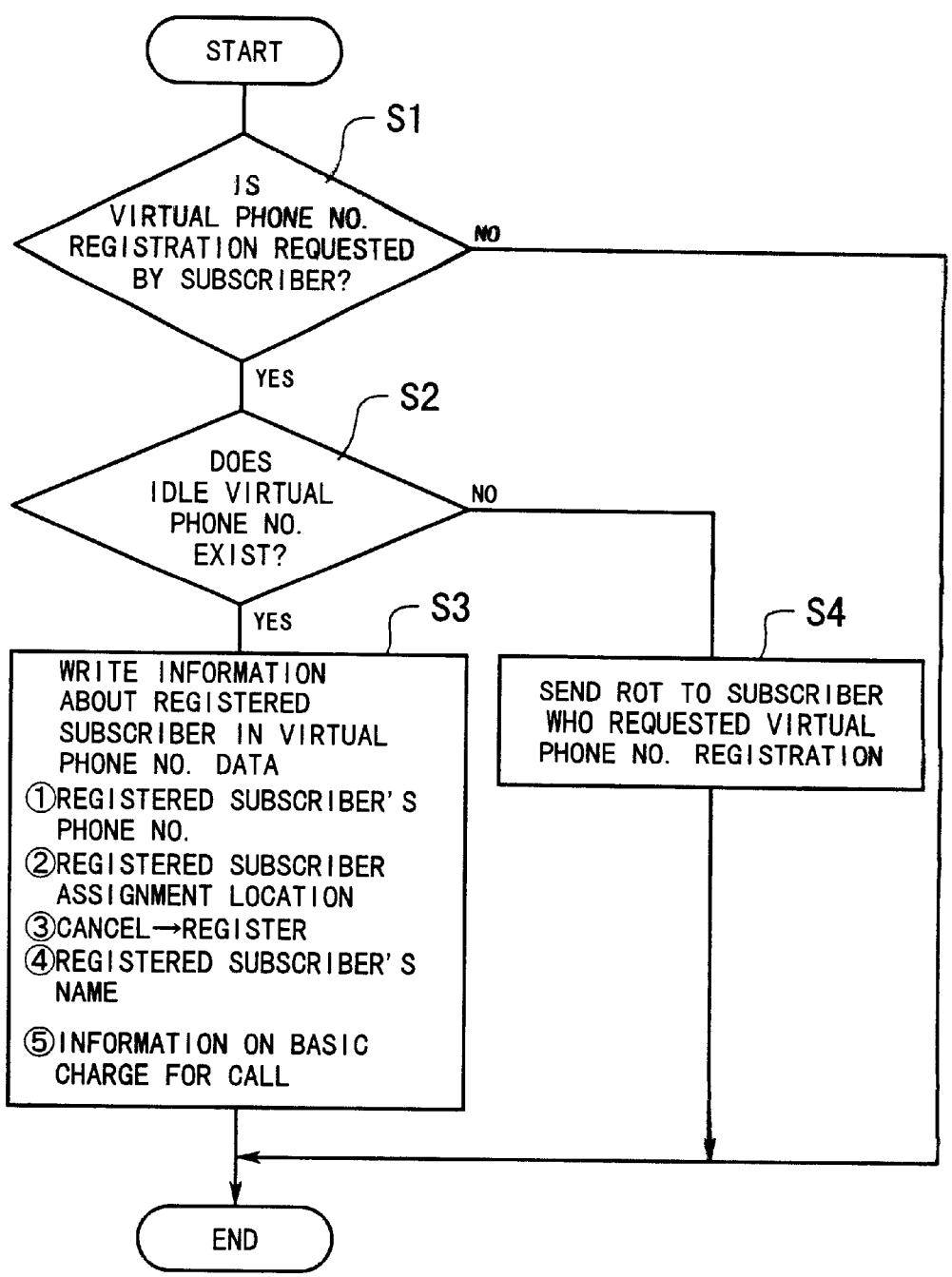
FIG. 4 is a flowchart showing a virtual telephone number registration process.

FIG. 4 illustrates a virtual telephone number registration process which is started in response to off-hook of a subscriber terminal.

Let it be assumed that the subscriber terminal 61 transmits a virtual telephone number registration request to the subordinate station 20, thereupon the central control unit 21 of the subordinate station 20 sends on the virtual telephone number registration request to the centralized management station 10. On detecting the virtual telephone number registration request thus transferred (S1), the central control unit 11 in the centralized management station 10 refers to the virtual telephone number data in the memory 11 and searches for a virtual telephone number in the "REGISTRATION/CANCELLATION FLAGS" field 123 of which is described a flag indicative of non-assignment of the virtual telephone number (S2). If such a virtual telephone number is found, that is, if an idle virtual telephone number exists, data items relating to the subscriber terminal 61, that is, the subscriber's telephone number, the subscriber assignment location, the subscriber's name and the basic charge for call, are set in the respective fields of the virtual telephone number data associated with the idle virtual telephone number. Then, a flag which indicates that this virtual telephone number is already assigned is described in the "REGISTRATION/CANCELLATION FLAG" field 123 (S3). If no idle virtual telephone number exists, on the other hand, the subordinate station 20 is notified that there is no idle virtual telephone number. The central control unit 21 in the subordinate station 20 sends out ROT (Reorder Tone) or voice to the subscriber terminal 61 to notify same that there is no idle virtual telephone number (S4).

Figure 5:
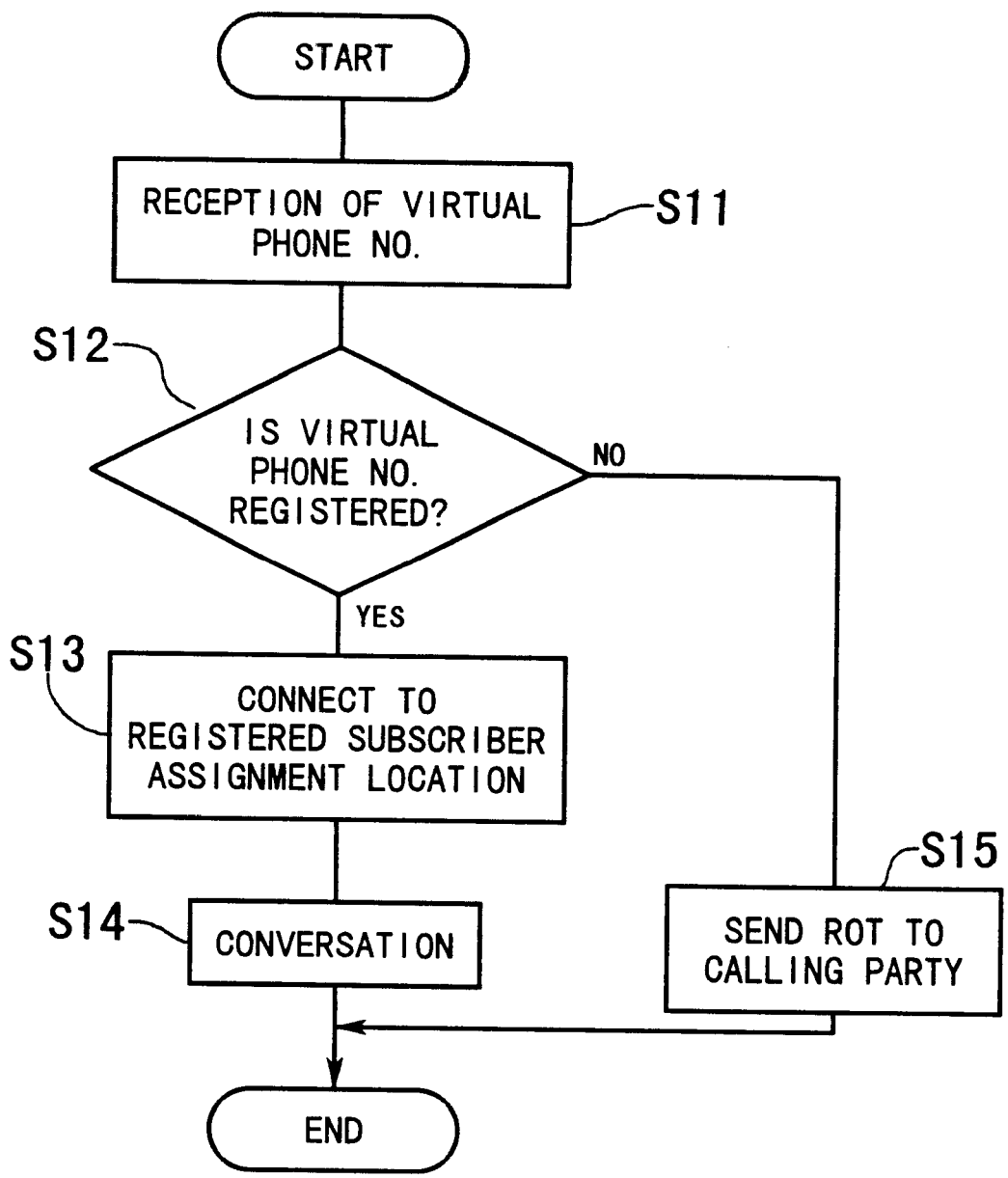
FIG. 5 is a flowchart showing a call initiation process executed in response to a call initiation request using a virtual telephone number.

FIG. 5 illustrates a call initiation process executed in response to a call initiation request using a virtual telephone number. This process is started in response to a call initiated by a subscriber terminal with the use of a virtual telephone number.

Here, let it be assumed that the subscriber terminal 64 transmits a call initiation request to the subordinate station 40 by using the virtual telephone number which the subscriber terminal 61 has registered. On receiving the call initiation request using the virtual telephone number from the subscriber terminal 64, the central control unit 41 in the subordinate station 40 inquires of the centralized management station 10 about the status of registration of this virtual telephone number. The central control unit 11 in the centralized management station 10, on receiving the inquiry, searches the virtual telephone number data in the memory 12 by virtual telephone number and looks up the "REGISTRATION/CANCELLATION FLAG" field 123 in the corresponding virtual telephone number data (S11, S12). If the field describes therein a flag indicating that the virtual telephone number is already assigned, the "REGISTERED SUBSCRIBER ASSIGNMENT LOCATION" field 122 is looked up to identify the subscriber assignment location, a connection request is then transmitted to the central control unit of the subordinate station to be connected (in this case, the subordinate station 20), and the subscriber terminal 64 is connected to the target subscriber terminal (S13). This permits telephone conversation (S14). If, as a result of search of the virtual telephone number data in the memory 12 by virtual telephone number, the "REGISTRATION/CANCELLATION FLAG" field 123 looked up describes therein a flag indicating that the virtual telephone number is not assigned, the subscriber terminal 64 is notified by ROT or voice that the virtual telephone number in question is not assigned (S15).

Figure 6:
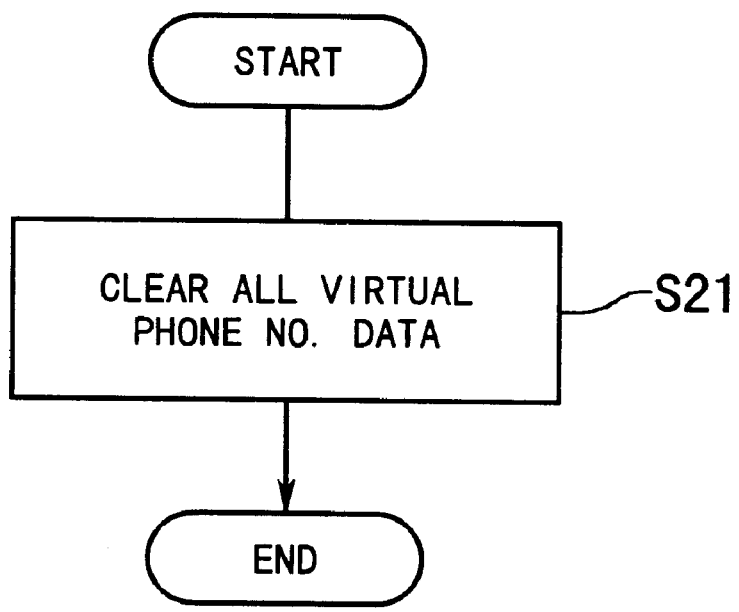
FIG. 6 is a flowchart showing a process for canceling the registration of virtual telephone numbers.

FIG. 6 illustrates a process for canceling the registration of virtual telephone numbers. This process is started at predetermined intervals of time, for example, at 8:00 every morning.

Specifically, in the centralized management station 10, 8:00 am is detected by the timer 14, whereupon the central control unit 11 deletes all the virtual telephone number data in the memory 12, thereby making all of the virtual telephone numbers idle (S21).

As described above, according to the first embodiment, the centralized management station 10 assigns a virtual telephone number to the subscriber terminal 61 at the request of the terminal 61, and registers the virtual telephone number in the memory 12 in association with the connection information on the subscriber terminal 61. When the subscriber terminal 64 makes a call using the virtual telephone number, the centralized management station 10 refers to the memory 12 to read out the connection information associated with the virtual telephone number, and based on the connection information, establishes a connection between the subscriber terminals 61 and 64. Accordingly, no telephone installation fee is required on the part of the subscriber terminal 61, and temporary use of a different telephone number is permitted without delay.

Also, the registration of virtual telephone numbers is automatically canceled at predetermined intervals of time, and therefore, it is possible to prevent deficiency of resources for virtual telephone numbers.

A second embodiment will be now described.

The second embodiment is basically identical in configuration with the first embodiment. In the following description of the second embodiment, therefore, identical reference numerals are used to denote identical component parts and description of such component parts is omitted.

Figure 7:
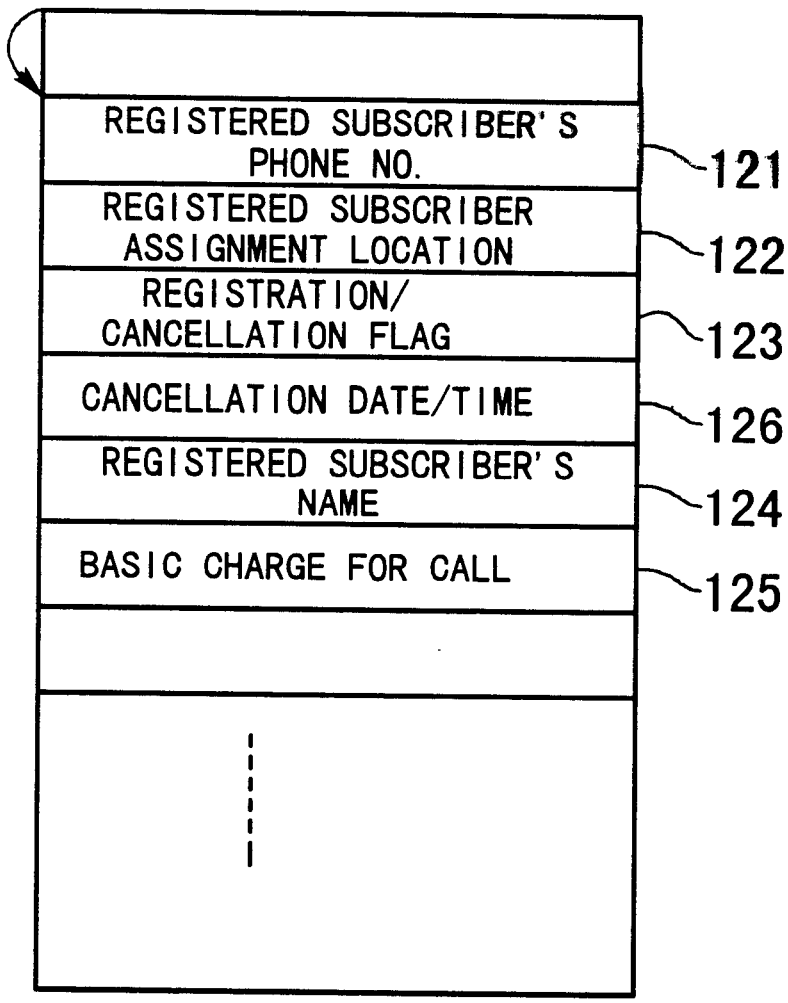
FIG. 7 is a diagram showing contents of virtual telephone number data stored in memory in the centralized management station.

FIG. 7 shows contents of virtual telephone number data stored in the memory 12 of the centralized management station 10. In the second embodiment, a "CANCELLATION DATE/TIME" field 126 is additionally provided in the memory 12 in the centralized management station 10. In the "CANCELLATION DATE/TIME" field 126, date and time for cancellation which the subscriber desires are described when the virtual telephone number data is set in Step S3 shown in FIG. 4. The cancellation date and time are the date and time at which the virtual telephone number data is to be automatically deleted.

Figure 8:
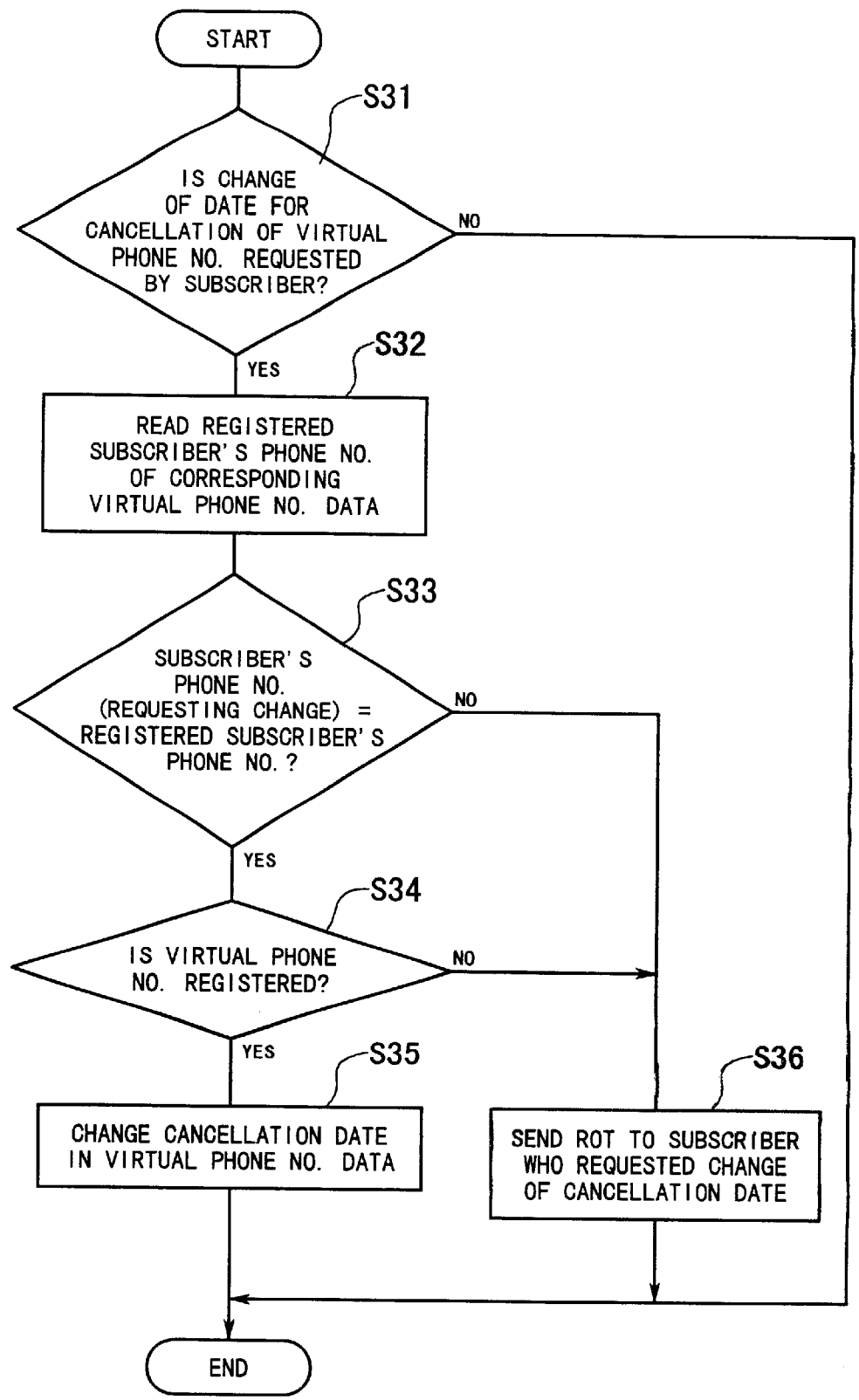
FIG. 8 is a flowchart showing a process for changing the cancellation date and time of virtual telephone number data according to a second embodiment.

FIG. 8 shows a process for changing the cancellation date and time in the virtual telephone number data according to the second embodiment. This process is started in response to off-hook of a subscriber terminal.

It is here assumed that the subscriber terminal 61 transmits a request to the subordinate station 20 to change the cancellation date and time already set. On receiving the request to change the date and time for cancellation of the virtual telephone number from the subscriber terminal 61 (S31), the central control unit 21 in the subordinate station 20 sends on the request to the centralized management station 10. The central control unit 11 in the centralized management station 10 reads out the virtual telephone number data in the memory 12, to determine whether or not the telephone number in the "REGISTERED SUBSCRIBER'S PHONE NO." field 121 of data associated with the virtual telephone number for which the change request has been made is identical with the subscriber's telephone number from which the change request has been received (S32, S33). If the former is identical with the latter, a determination is then made as to whether or not a flag indicative of assignment of the virtual telephone number is described in the "REGISTRATION/CANCELLATION FLAG" field 123 (S34). If an assignment-indicative flag is described, that is, if the virtual telephone number for which the change request has been made is registered, the cancellation date and time already described in the "CANCELLATION DATE/TIME" field 126 are changed to the date and time specified by the subscriber (S35). If the result of decision in either Step S33 or S34 is negative (NO), the subordinate station 20 is notified that the change request is not acceptable, and the central control unit 21 in the subordinate station 20 notifies the subscriber terminal 61 by ROT or voice that the change request is not acceptable (S36).

Figure 9:
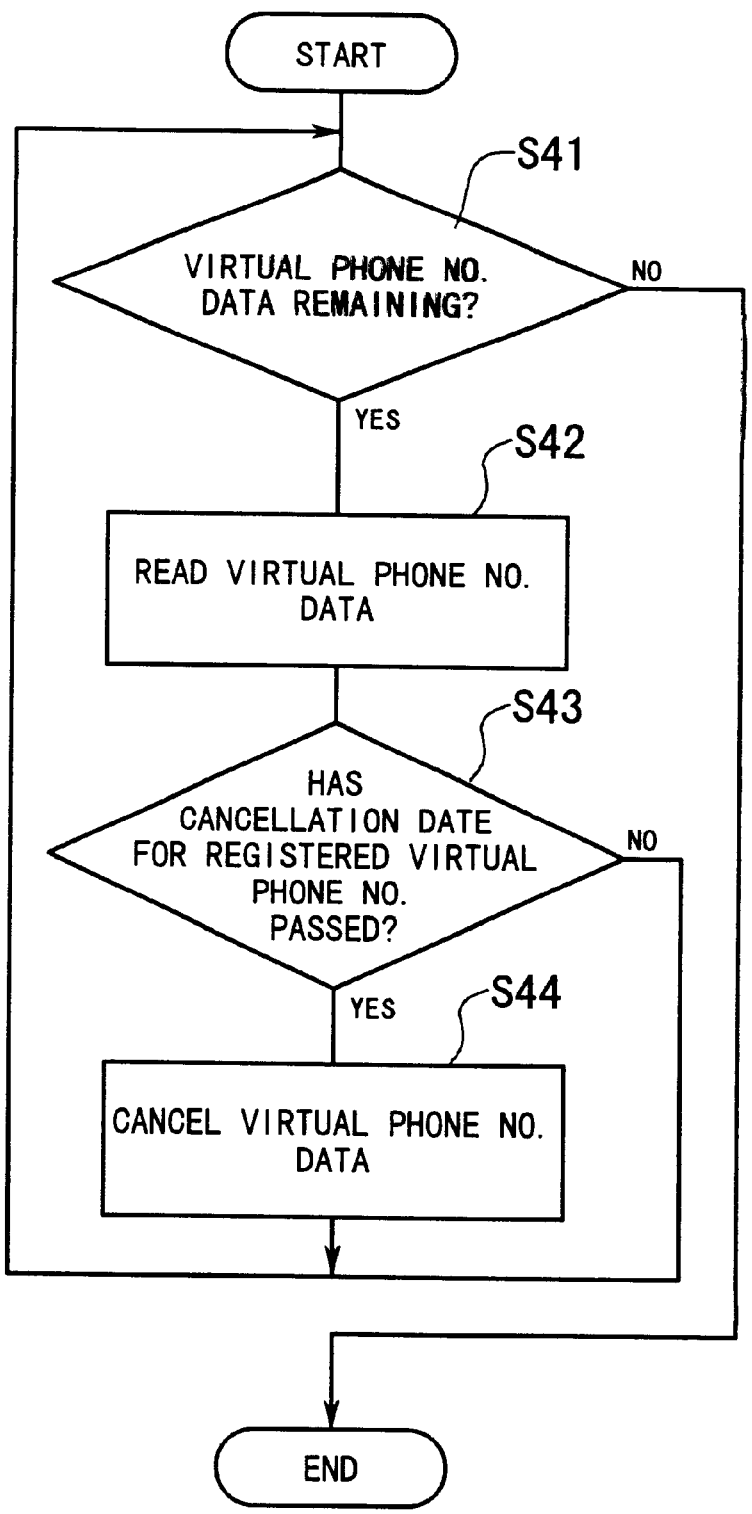
FIG. 9 is a flowchart showing a process for canceling the registration of virtual telephone number data according to the second embodiment.

FIG. 9 illustrates a process for canceling the registration of virtual telephone number data according to the second embodiment. This process is started at predetermined intervals of time.

In the centralized management station 10, when 8:00 am, for example, is detected by the timer 14, the central control unit 11 successively reads out the virtual telephone number data in the memory 12 (S41, S42). Among the virtual telephone number data thus read out, virtual telephone number data of which the date/time described in the "CANCELLATION DATE/TIME" field 126 has already passed, if any, is cleared (S43, S44).

Thus, all of the virtual telephone number data in the memory 12 is periodically checked and virtual telephone number data whose cancellation date/time has passed is automatically deleted.

The other operations are identical with those of the first embodiment.

A third embodiment will be now described.

The third embodiment is basically identical in configuration with the second embodiment. Therefore, in the following description of the third embodiment, reference should also be made to the configuration of the second embodiment.

Figure 10:
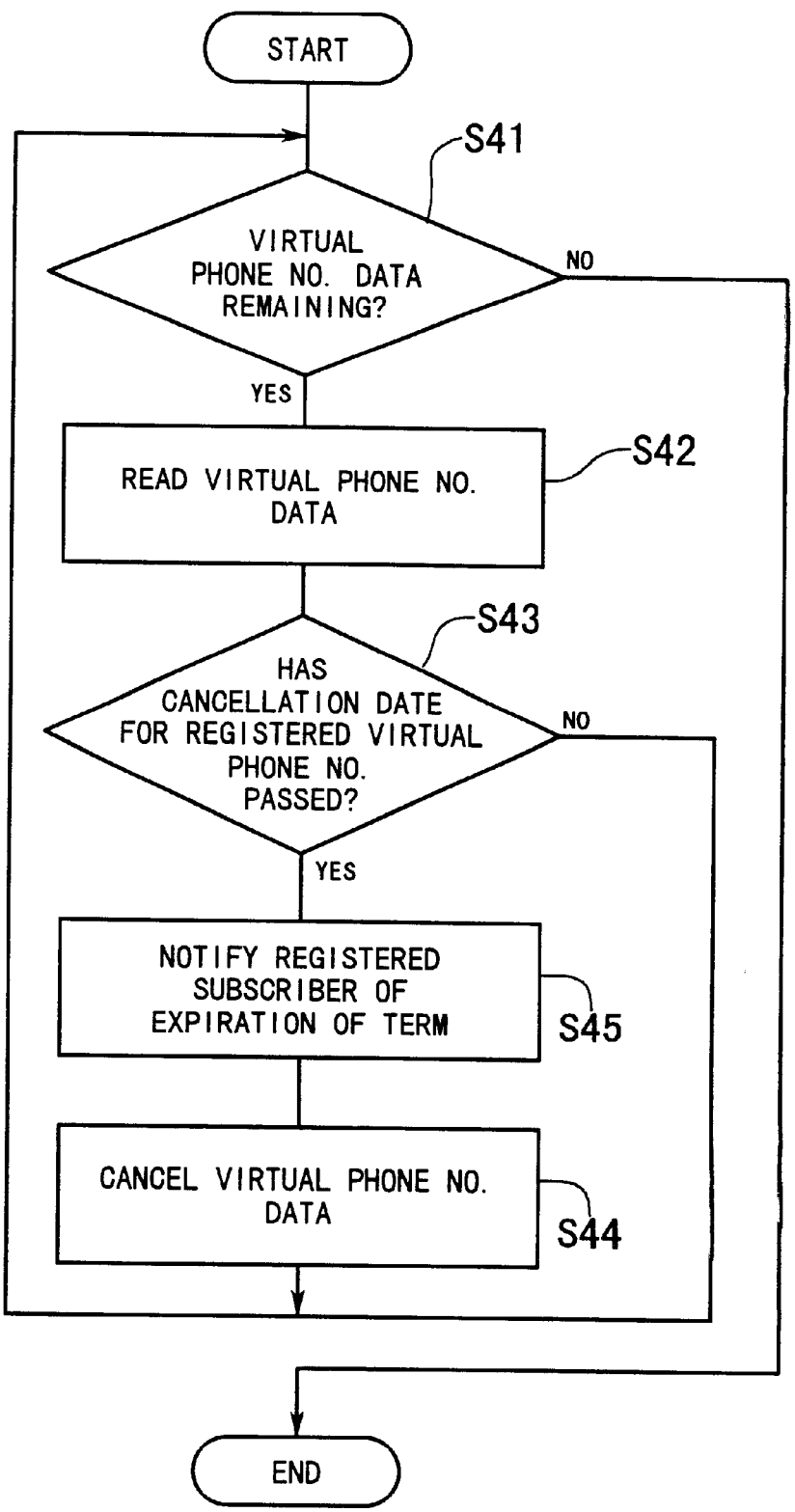
FIG. 10 is a flowchart showing a process for changing the cancellation date and time of virtual telephone number data according to a third embodiment.

FIG. 10 illustrates a process for changing the date and time for cancellation of the virtual telephone number data according to the third embodiment. This process is basically identical with the cancellation date/time change process for the virtual telephone number data according to the second embodiment; therefore, identical step numbers are used to represent identical steps and only a different step will be explained.

In the third embodiment, Step S45 is inserted between Steps S43 and S44. In Step S45, the centralized management station 10 notifies the operator of the subscriber terminal 61, who is the registrant of a virtual telephone number whose cancellation date/time has passed, that the cancellation date/time has passed. Specifically, the centralized management station 10 notifies the central control unit 21 in the subordinate station 20 that the cancellation date/time has passed, and the central control unit 21 in the subordinate station 20 notifies the subscriber terminal 61 that the term of registration has expired.

Subsequently, the corresponding virtual telephone number data is cleared (S44).

This prevents registrants of virtual telephone numbers from misunderstanding that their virtual telephone numbers are still registered, though in actuality the registration term has expired and thus the registration canceled.

A fourth embodiment will be now described.

The fourth embodiment is basically identical in configuration with the third embodiment. Therefore, in the following description of the fourth embodiment, reference should also be made to the configuration of the third embodiment.

Figure 11:
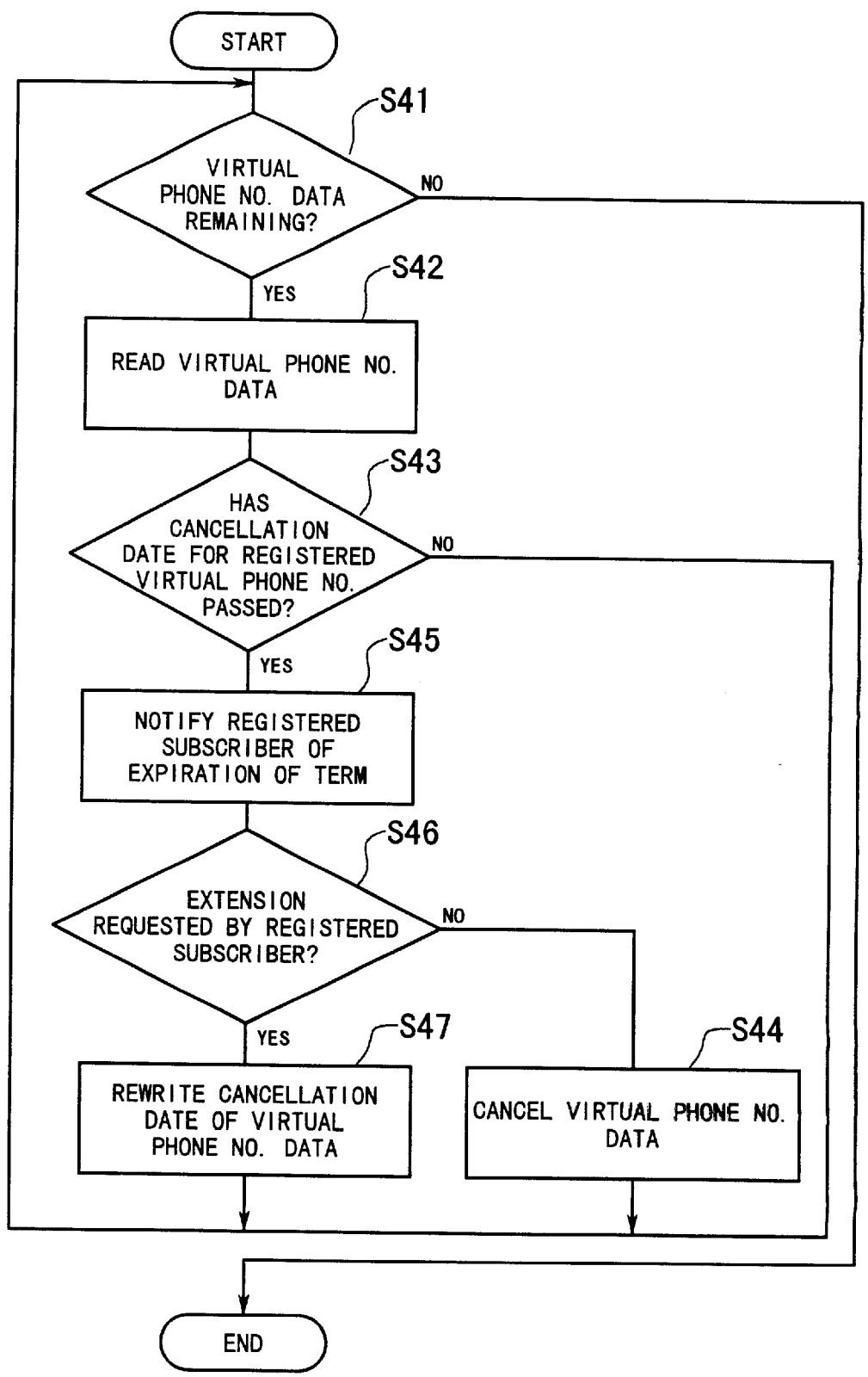
FIG. 11 is a flowchart showing a process for changing the cancellation date and time of virtual telephone number data according to a fourth embodiment.

FIG. 11 illustrates a process for changing the date and time for cancellation of the virtual telephone number data according to the fourth embodiment. This process is basically identical with the cancellation date/time change process for the virtual telephone number data according to the third embodiment; therefore, identical step numbers are used to represent identical steps and only different steps will be explained.

In the fourth embodiment, Steps S46 and S47 are inserted following Step S45. If, in Step S46, a request for extension of the registration term is received from the subscriber terminal 61 in response to the notification to the terminal 61 that the registration term has expired, the central control unit 21 in the subordinate station 20 makes an extension request to the central control unit 11 in the centralized management station 10. On receiving the extension request, the central control unit 11 in the centralized management station 10 updates the cancellation date and time in the "CANCELLATION DATE/TIME" field 126 of the corresponding virtual telephone number data (S47). The updating is effected by deferring the cancellation date/time by only a predetermined term (e.g., one day) or by accepting a new registration term specified by the subscriber terminal 61.

If the central control unit 21 in the subordinate station 20 receives no request for extension of the registration term from the subscriber terminal 61, then it requests the central control unit 11 in the centralized management station 10 to cancel the virtual telephone number data. On receiving the cancellation request, the central control unit 11 in the centralized management station 10 clears the registered data associated with the corresponding virtual telephone number (S44).

Thus, the cancellation date and time can be postponed.

A fifth embodiment will be now described.

The fifth embodiment is basically identical in configuration with the first embodiment. In the following description of the fifth embodiment, therefore, reference should also be made to the configuration of the first embodiment.

Figure 12:
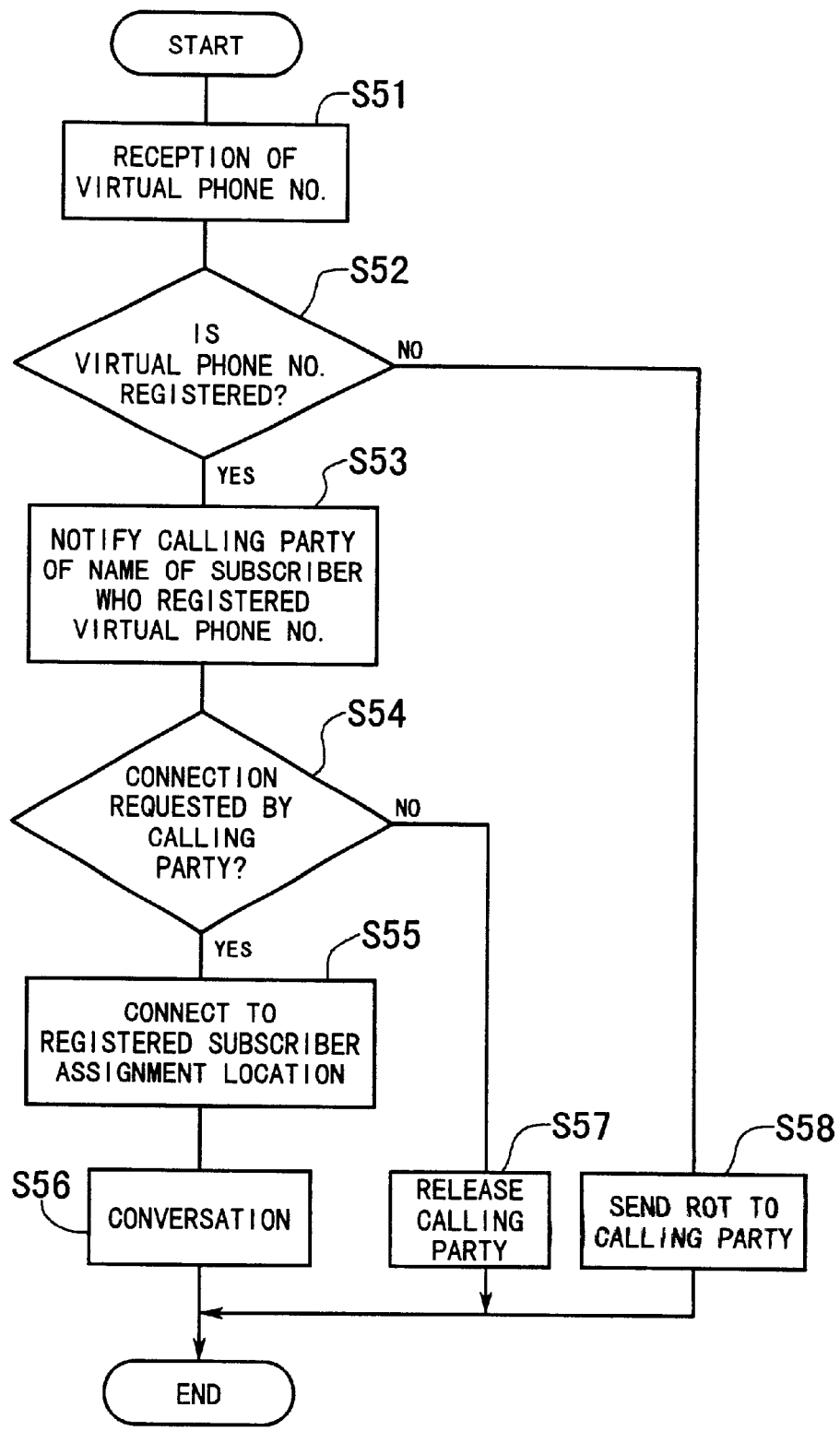
FIG. 12 is a flowchart showing a call initiation process by means of a virtual telephone number according to a fifth embodiment.

FIG. 12 shows a call initiation process by means of a virtual telephone number according to the fifth embodiment. This process is started upon reception of a virtual telephone number from a subscriber terminal.

Let it be assumed here that the subscriber terminal 64 makes a call initiation request to the subordinate station 40 by using the virtual telephone number assigned to the subscriber terminal 61. On receiving the call initiation request, the central control unit 41 in the subordinate station 40 inquires of the centralized management station 10 about the status of registration of the requested virtual telephone number. The central control unit 11 in the centralized management station 10, on receiving the inquiry, searches the memory 12 for data associated with the requested virtual telephone number, and looks up the "REGISTRATION/CANCELLATION FLAG" field 123 in the data (S51, S52). If a flag indicative of assignment is described in the field, the central control unit 11 reads out the subscriber's name from the "REGISTERED SUBSCRIBER'S NAME" field 124 in the data associated with the requested virtual telephone number and stored in the memory 12, and notifies the central control unit 41 in the subordinate station 40 of the subscriber's name (S53). On receiving the notification, the central control unit 41 notifies the subscriber terminal 64 of the name of the subscriber who has registered the virtual telephone number. If, in response to the notification, the subscriber terminal 64 sends a connection request to the subordinate station 40 (S54), the central control unit 41 in the subordinate station 40 makes a connection request to the central control unit 11 in the centralized management station 10. The central control unit 11 in the centralized management station 10, on receiving the connection request, reads out the subscriber assignment location from the "REGISTERED SUBSCRIBER ASSIGNMENT LOCATION" field 122 in the data associated with the requested virtual telephone number and stored in the memory 12, and transmits a connection request to the central control unit 21 of the subordinate station 20 to bring the subscriber terminals 64 and 61 to a state of telephone conversation (S55, S56).

If it is judged in Step S52 that a flag indicative of non-assignment is described, the central control unit 11 requests the central control unit 41 of the subordinate station 40 that ROT or voice which indicates incapability of call initiation be sent to the subscriber terminal 64 (S58).

On the other hand, if it is judged in Step S54 that no connection request is sent from the subscriber terminal 64 to the subordinate station 40, the subscriber terminal 64 is released (S57).

The other operations are identical with those of the first embodiment.

Thus, prior to call connection, the calling party can confirm and make sure of the name of the subscriber who has registered the virtual telephone number, and accordingly, erroneous connection to another subscriber who registered the same virtual telephone number at a later time can be prevented.

A sixth embodiment will be now described.

The sixth embodiment is basically identical in configuration with the first embodiment. Therefore, in the following description of the sixth embodiment, reference should also be made to the configuration of the first embodiment.

Figure 13:
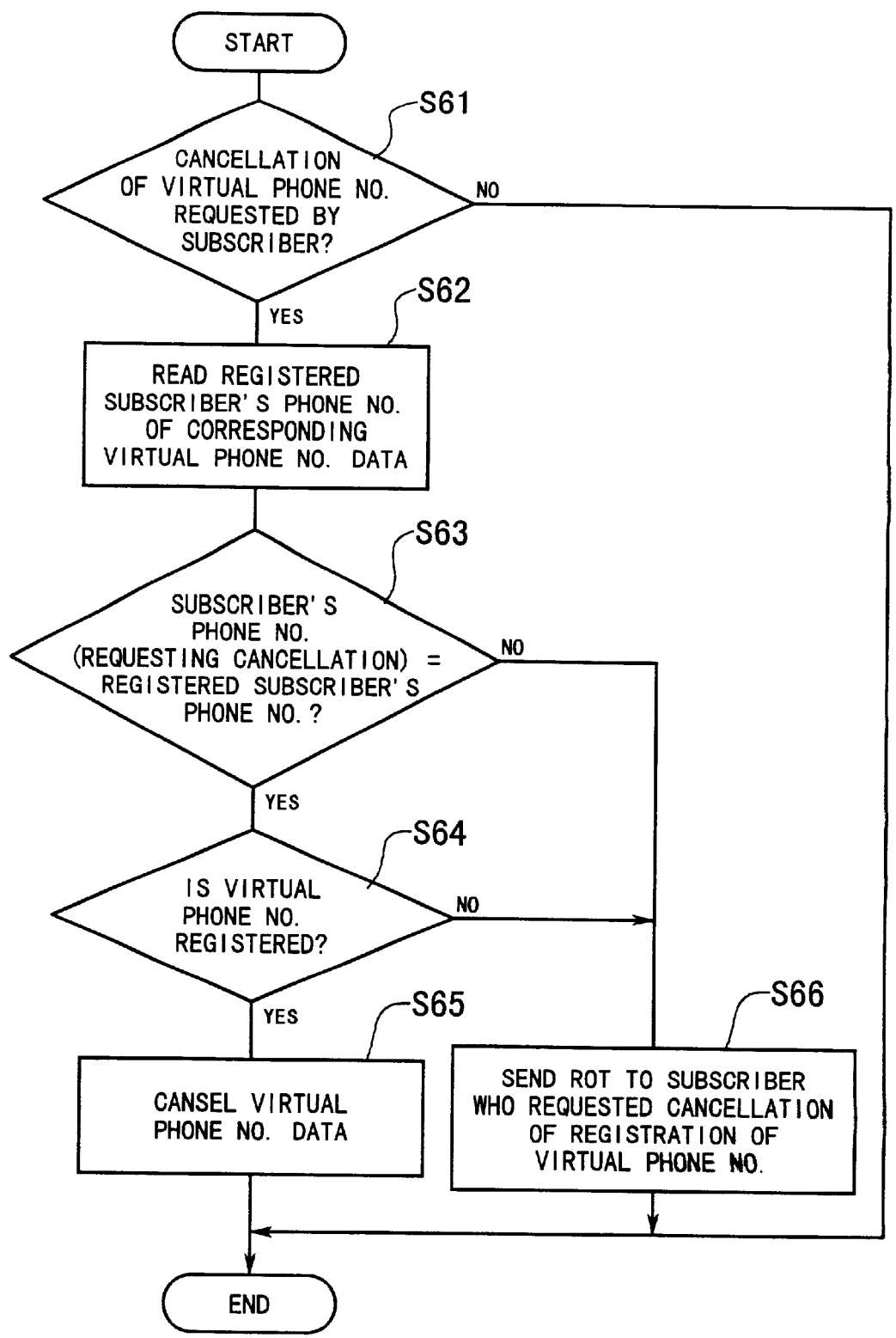
FIG. 13 is a flowchart showing a process for requesting cancellation of the registration of a virtual telephone number according to a sixth embodiment.

FIG. 13 shows a process for requesting cancellation of the registration of a virtual telephone number according to the sixth embodiment. This process is started upon reception of a virtual telephone number cancellation request from a subscriber terminal.

It is here assumed that the subscriber terminal 61 requests the subordinate station 20 to cancel registration of the virtual telephone number assigned thereto. On receiving the virtual telephone number cancellation request from the subscriber terminal 61 (S61), the central control unit 21 in the subordinate station 20 sends on the request to the centralized management station 10. The central control unit 11 in the centralized management station 10 reads out the virtual telephone number data in the memory 12, to determine whether or not the telephone number in the "REGISTERED SUBSCRIBER'S PHONE NO." field 121 of data associated with the virtual telephone number for which the cancellation request has been made is identical with the subscriber's telephone number from which the cancellation request has been received (S62, S63). If the former is identical with the latter, a determination is then made as to whether or not a flag indicative of assignment is described in the "REGISTRATION/CANCELLATION FLAG" field 123 (S64). If an assignment-indicative flag is described, that is, if the virtual telephone number with respect to which the cancellation request has been made is registered, the corresponding virtual telephone number data is deleted (S65). Then, a flag indicative of non-assignment is described in the "REGISTRATION/CANCELLATION FLAG" field 123.

If the result of decision in either Step S63 or S64 is negative (NO), the subordinate station 20 is notified of non-acceptance of the cancellation request, and the central control unit 21 in the subordinate station 20 notifies the subscriber terminal 61 of non-acceptance of the cancellation request by ROT or voice (S66).

The other operations are identical with those of the first embodiment.

Thus, when the virtual telephone number is no longer necessary, the registration thereof can be canceled even before the registration term expires, permitting efficient use of a limited number of virtual telephone numbers.

A seventh embodiment will be now described.

The seventh embodiment Is basically identical in configuration with the first embodiment. In the following description of the seventh embodiment, therefore, reference should also be made to the configuration of the first embodiment.

Figure 14:
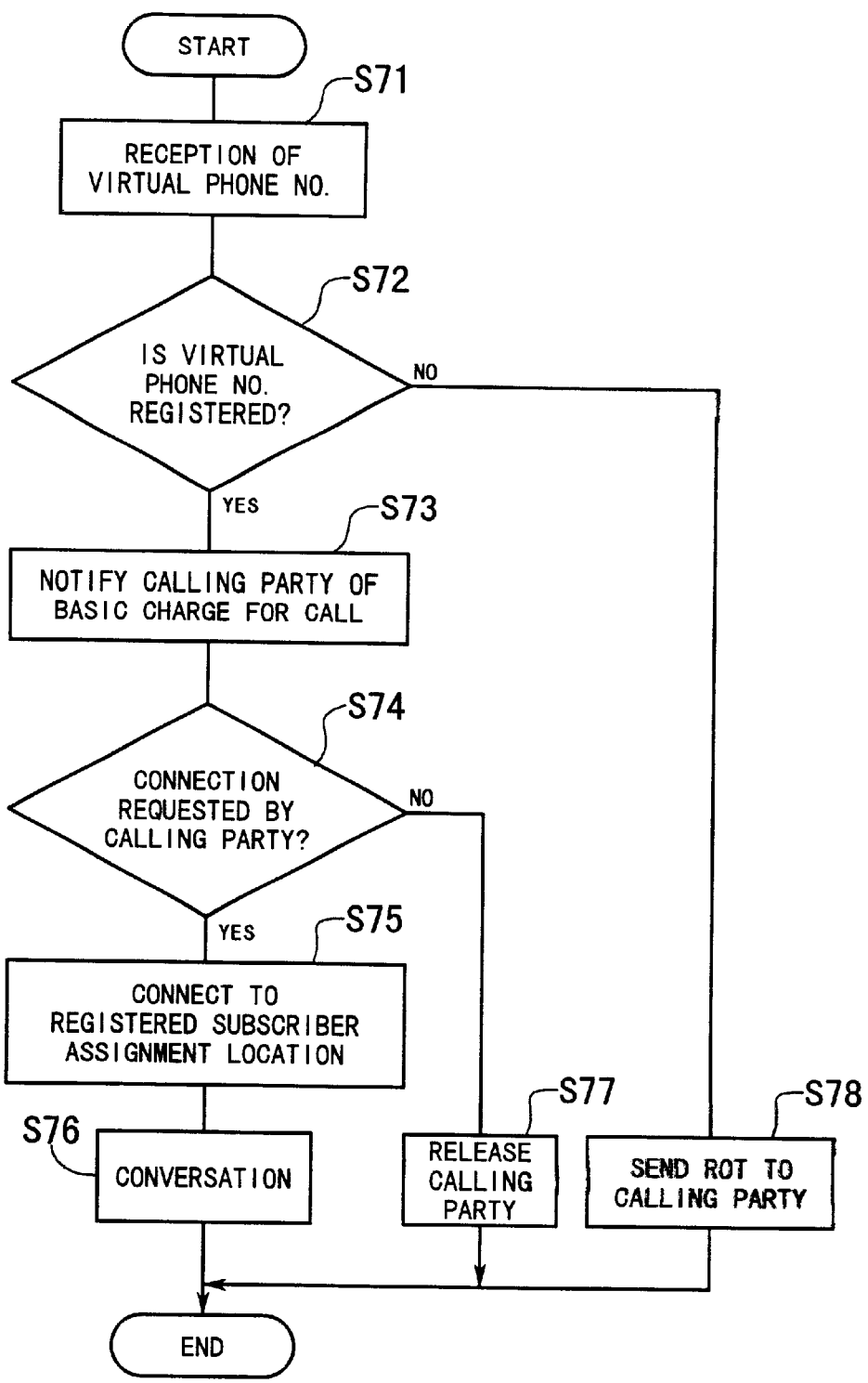
FIG. 14 is a flowchart showing a call initiation process by means of a virtual telephone number according to a seventh embodiment.

FIG. 14 shows a call initiation process by means of a virtual telephone number according to the seventh embodiment. This process is started upon reception of a virtual telephone number from a subscriber terminal.

It is assumed here that the subscriber terminal 64 makes a call initiation request to the subordinate station 40 by using the virtual telephone number assigned to the subscriber terminal 61. On receiving the call initiation request, the central control unit 41 in the subordinate station 40 inquires of the centralized management station 10 about the status of registration of the requested virtual telephone number. The central control unit 11 in the centralized management station 10, on receiving the inquiry, searches the memory 12 for data associated with the requested virtual telephone number, and looks up the "REGISTRATION/CANCELLATION FLAG" field 123 in the data (S71, S72). If a flag indicative of assignment is described in the field, the central control unit 11 reads out the basic charge from the "BASIC CHARGE FOR CALL" field 125 in the data associated with the requested virtual telephone number and stored in the memory 12, calculates a basic charge applicable to a call, and notifies the central control unit 41 in the subordinate station 40 of the basic charge (S73). On receiving the notification, the central control unit 41 notifies the subscriber terminal 64 of the basic charge applicable when a call is established with the subscriber terminal 61 with respect to which the call initiation request has been made. If, in response to the notification, the subscriber terminal 64 sends a connection request to the subordinate station 40 (S74), the central control unit 41 in the subordinate station 40 makes a connection request to the central control unit 11 in the centralized management station 10. The central control unit 11 in the centralized management station 10, on receiving the connection request, reads out the subscriber assignment location from the "REGISTERED SUBSCRIBER ASSIGNMENT LOCATIONS" field 122 in the data associated with the requested virtual telephone number and stored in the memory 12, and transmits a connection request to the central control unit 21 of the subordinate station 20 to bring the subscriber terminals 64 and 61 to a state of telephone conversation (S75, S76).

If it is judged in Step S72 that a flag indicative of non-assignment is described, the central control unit 11 requests the central control unit 41 of the subordinate station 40 that ROT or voice which indicates incapability of call initiation be sent to the subscriber terminal 64 (S78).

On the other hand, if it is judged in Step S74 that no connection request is sent from the subscriber terminal 64 to the subordinate station 40, the subscriber terminal 64 is released (S77).

The other operations are identical with those of the first embodiment.

Thus, prior to call connection, the calling party can confirm and make sure of the basic charge applicable when a call is established with a subscriber terminal having a registered virtual telephone number, and accordingly, can estimate a telephone charge that cannot be reckoned from the virtual telephone number alone.

An eighth embodiment will be now described.

The eighth embodiment is basically identical in configuration with the first embodiment; therefore, identical reference numerals are used to represent identical component parts and description of such component parts is omitted.

In the eighth embodiment, the memory in each subordinate station is provided with a ringer type table.

Figure 15:
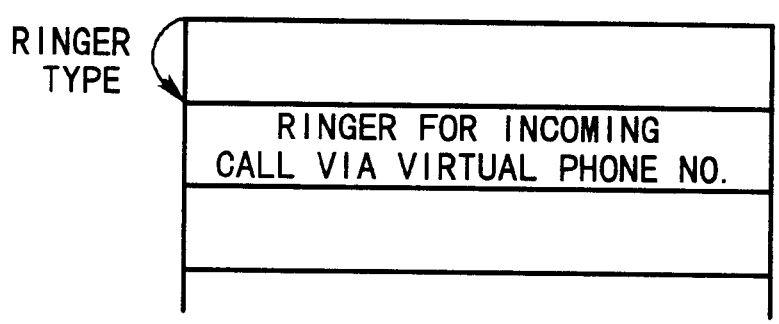
FIG. 15 is a diagram showing a ringer type table stored in memory in each subordinate station according to an eighth embodiment.

FIG. 15 shows the ringer type table provided in the memory of each subordinate station. Specifically, the ringer type table describes therein a ringing tone which is to be sounded in the case of an incoming call via a virtual telephone number. In the ringer type table is also described a ringing tone which is to be sounded in the case of an ordinary incoming call, though not shown in FIG. 15. The ringing tone to be sounded in the case of an incoming call via a virtual telephone number is set so as to be different from that sounded in the case of an ordinary incoming call.

Figure 16:
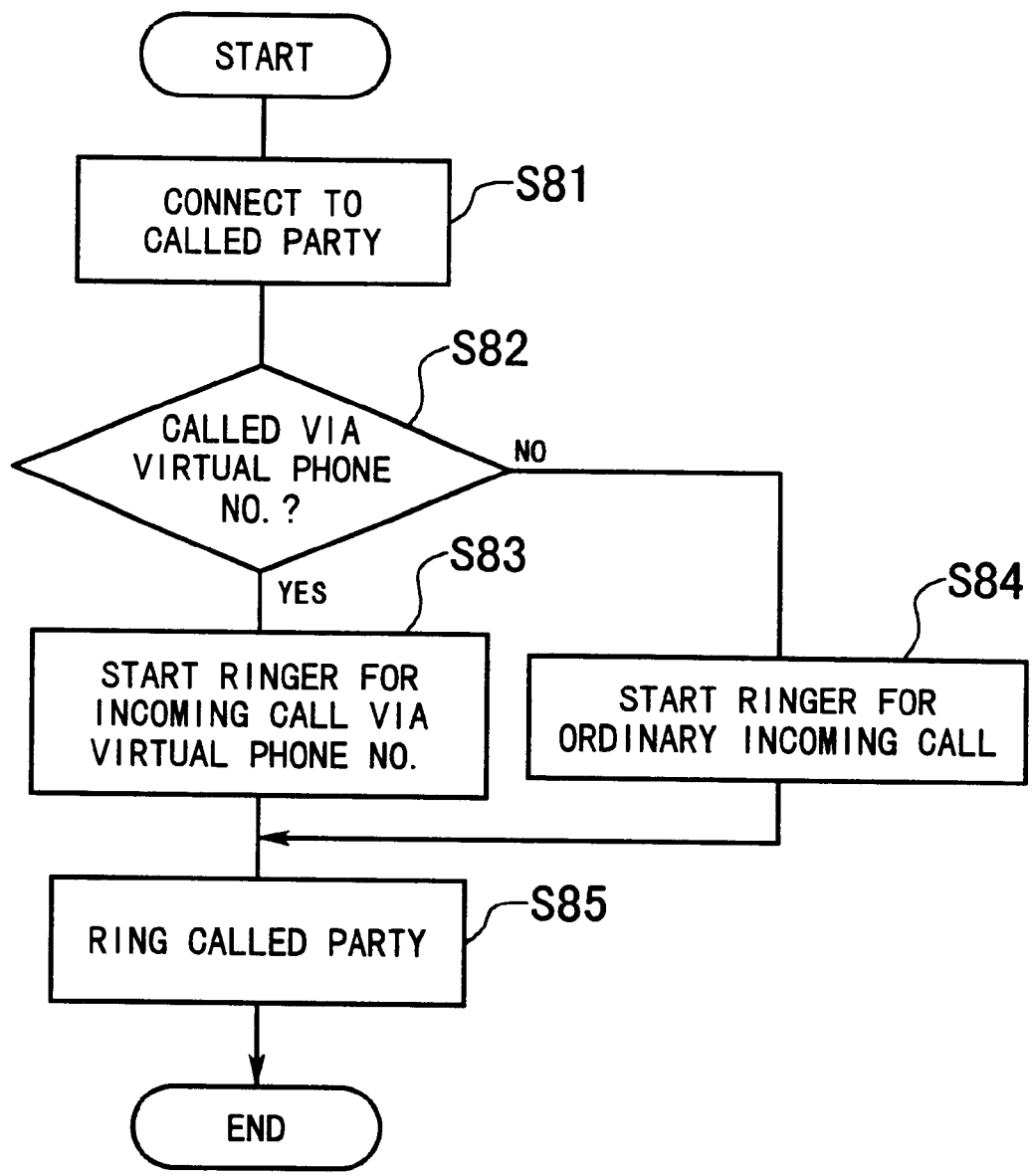
FIG. 16 is a flowchart showing a call reception process according to the eighth embodiment.

FIG. 16 shows a call reception process according to the eighth embodiment. This process is started upon reception of a call from a subscriber terminal.

When a call reception request is made with respect to the subscriber terminal 61, for example, the central control unit 21 in the subordinate station 20 determines based on call information whether the call reception request specifies reception via the ordinary telephone number or the virtual telephone number (S81, S82). In the case of call reception via the virtual telephone number, the central control unit 21 in the subordinate station 20 refers to the ringer type table in the memory 22 to read out the ringer for incoming call via virtual telephone number, and transmits the read ringer to the subscriber terminal 61 to notify same of the incoming call (S83, S85). On the other hand, in the case of call reception via the ordinary telephone number, the central control unit 21 in the subordinate station 20 refers to the ringer type table in the memory 22 to read out the ringer for ordinary incoming call, and transmits the read ringer to the subscriber terminal 61 to notify same of the incoming call (S84, S85).

The other operations are identical with those of the first embodiment.

Thus, on receiving a call, a subscriber who has registered a virtual telephone number can judge by the ringing tone whether the incoming call is a call via the virtual telephone number or the ordinary telephone number.

A ninth embodiment will be now described.

The ninth embodiment is basically identical in configuration with the first embodiment; therefore, identical reference numerals are used to represent identical component parts and description of such component parts is omitted.

Figure 17:
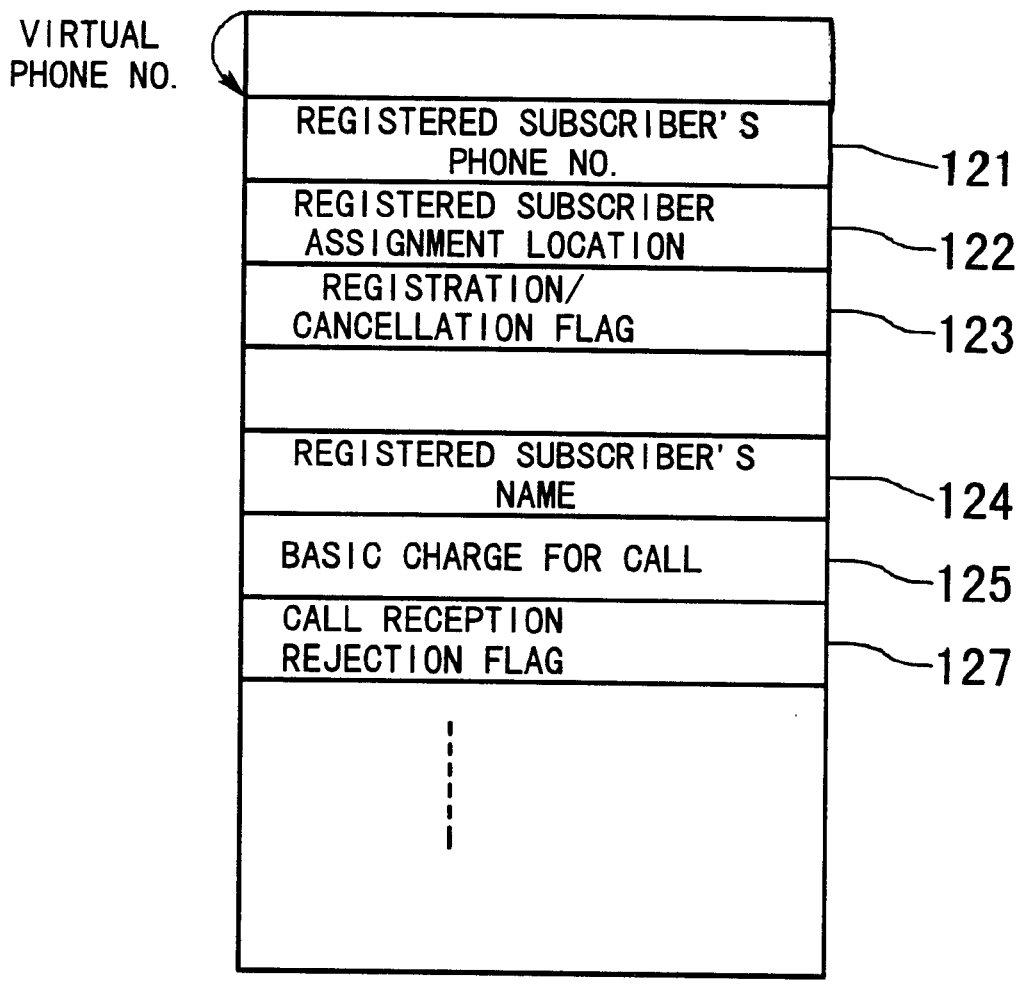
FIG. 17 is a diagram showing contents of virtual telephone number data stored in memory in the centralized management station according to a ninth embodiment.

FIG. 17 illustrates contents of virtual telephone number data stored in the memory 12 in the centralized management station 10 according to the ninth embodiment. In the ninth embodiment, a "CALL RECEPTION REJECTION FLAG" field 127 is additionally provided in the memory 12 in the centralized management station 10. In the "CALL RECEPTION REJECTION FLAG" field 127 is described a flag which indicates that call connection is to be rejected for a call reception request using the corresponding virtual telephone number.

Figure 18:
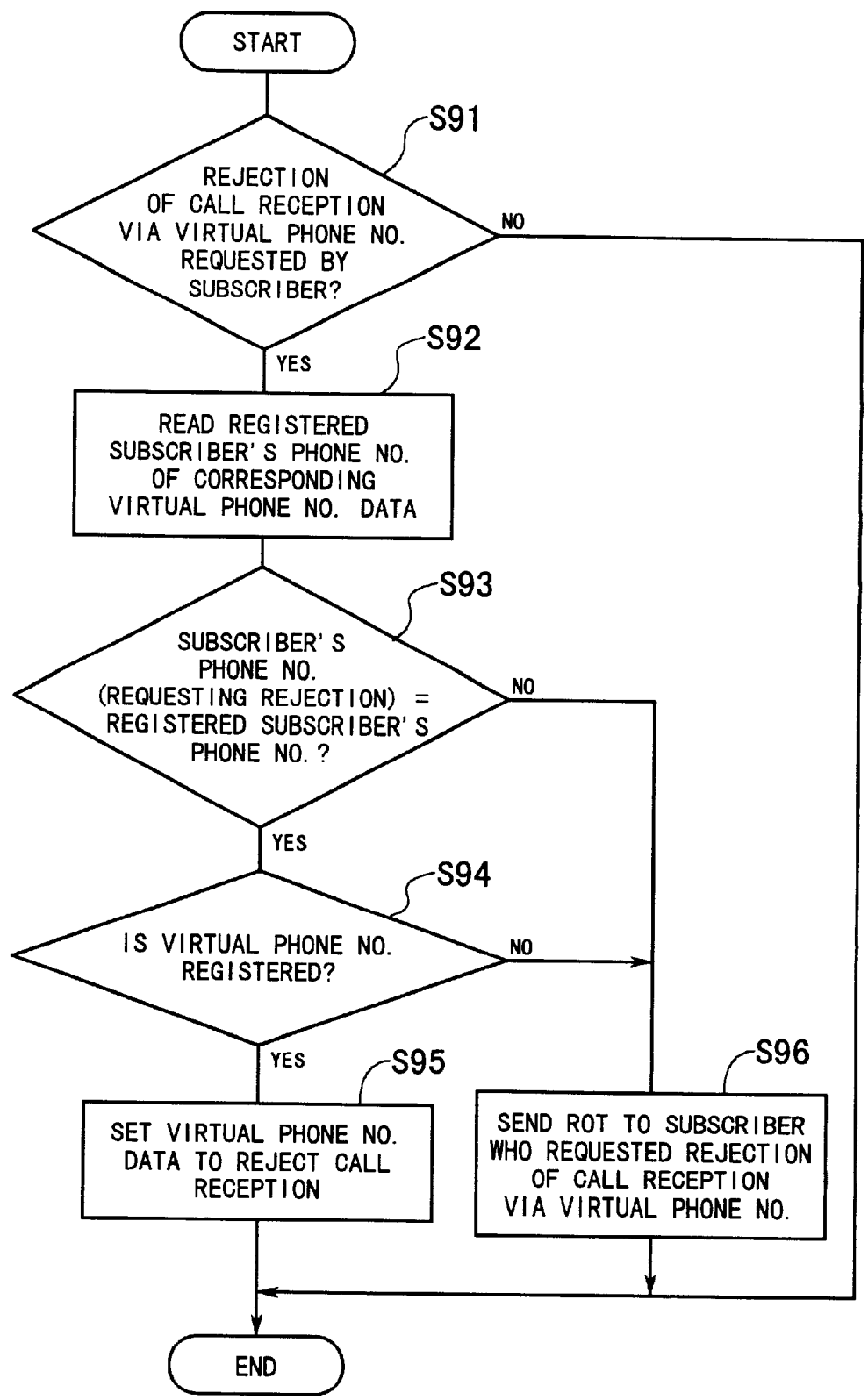
FIG. 18 is a flowchart showing a process for setting a flag to reject a call reception request using a virtual telephone number according to the ninth embodiment.

FIG. 18 illustrates a process for setting the flag to reject a call reception request using a virtual telephone number according to the ninth embodiment. This process is started in response to off-hook of a subscriber terminal.

Let it be assumed that a request to reject call reception via virtual telephone number is sent from the subscriber terminal 61 to the subordinate station 20, for example. On receiving from the subscriber terminal 61 the request to reject such call reception (S91), the central control unit 21 in the subordinate station 20 sends on the request to the centralized management station 10. The central control unit 11 in the centralized management station 10 reads out the virtual telephone number data in the memory 12 and determines whether or not the telephone number in the "REGISTERED SUBSCRIBER'S PHONE NO." field 121 of data associated with the virtual telephone number with respect to which rejection of call reception has been requested is identical with the subscriber's telephone number from which the request for rejection of call reception has been received (S92, S93). If the former is identical with the latter, a determination is made as to whether or not a flag indicative of assignment is described in the "REGISTRATION/CANCELLATION FLAG" field 123 (S94). If an assignment-indicative flag is described, that is, if the virtual telephone number with respect to which rejection of call reception has been requested is registered, a flag indicating that call reception is to be rejected is described in the "CALL RECEPTION REJECTION FLAG" field 127 (S95).

If the result of decision in either Step S93 or S94 is negative (NO), the subordinate station 20 is notified of non-acceptance of the request for rejection of call reception, and the central control unit 21 in the subordinate station 20 notifies the subscriber terminal 61 of non-acceptance of the call reception rejection request by ROT or voice (S96).

Figure 19:
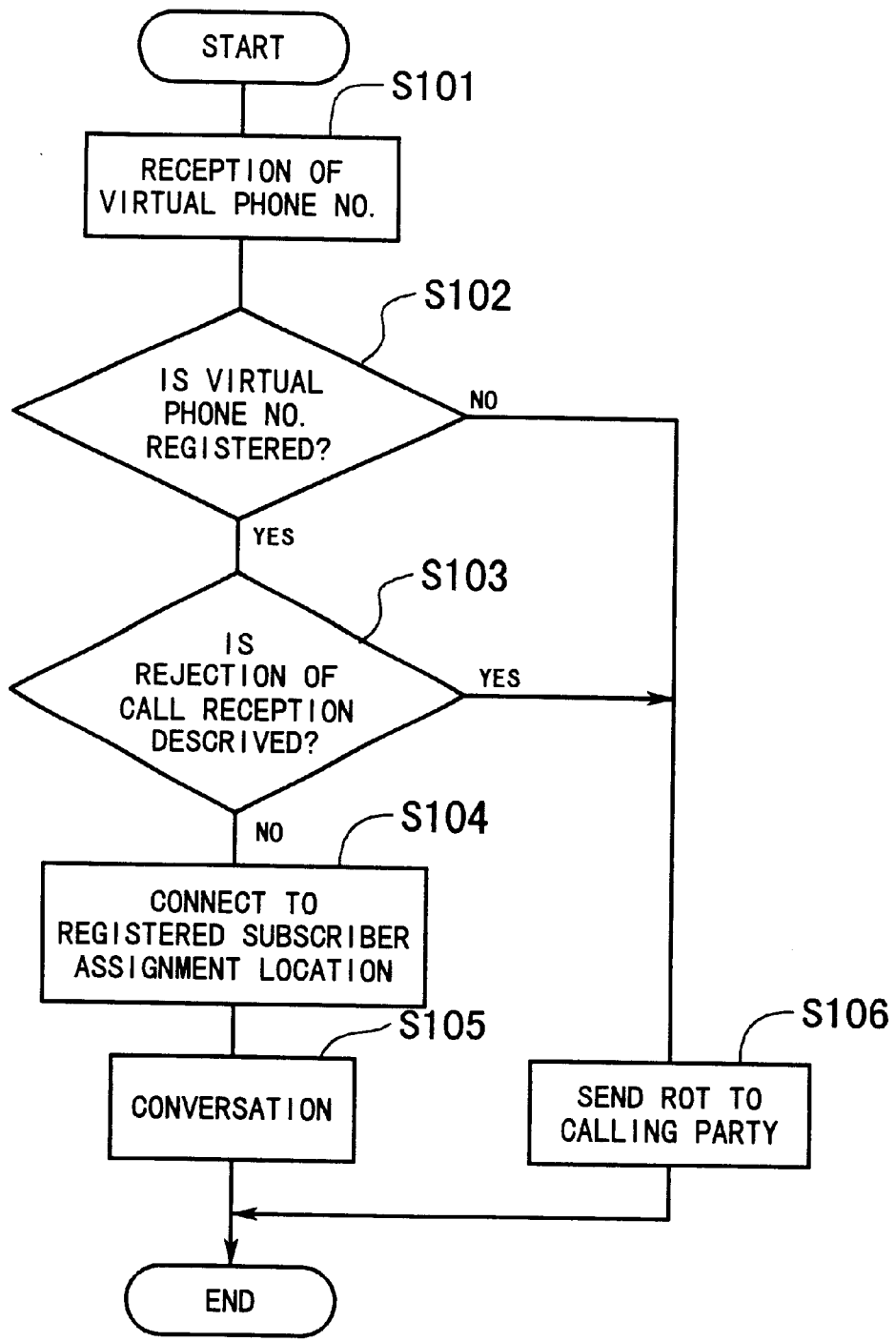
FIG. 19 is a flowchart showing a call initiation process by means of a virtual telephone number according to the ninth embodiment.

FIG. 19 shows a call initiation process by means of a virtual telephone number according to the ninth embodiment. This process is started upon reception of a call initiation request using a virtual telephone number.

Let it be assumed here that the subscriber terminal 64 makes a call initiation request to the subordinate station 40 by using a virtual telephone number. On receiving the call initiation request, the central control unit 41 in the subordinate station 40 inquires of the centralized management station 10 about the status of registration of the requested virtual telephone number. The central control unit 11 in the centralized management station 10, on receiving the inquiry, searches the memory 12 for data associated with the requested virtual telephone number, and looks up the "REGISTRATION/CANCELLATION FLAG" field 123 in the data (S101, S102). If a flag indicative of assignment is described in the field, the central control unit 11 then determines whether or not a flag indicative of call reception rejection is described in the "CALL RECEPTION REJECTION FLAG" field 127 of the data associated with the requested virtual telephone number and stored in the memory 12 (S103). If there is no flag indicative of call reception rejection described in the field, the central control unit 11 reads out the subscriber assignment location from the "REGISTERED SUBSCRIBER ASSIGNMENT LOCATION" field 122 in the data associated with the requested virtual telephone number and stored in the memory 12, and transmits a connection request to the central control unit 21 of the subordinate station 20 to bring the subscriber terminals 64 and 61 to a state of telephone conversation (S104, S105).

If the result of decision in Step S102 is negative (NO) or the result of decision in Step S103 is positive (YES), the central control unit 11 requests the central control unit 41 of the subordinate station 40 that ROT or voice which indicates incapability of call initiation be sent to the subscriber terminal 64 (S106).

The other operations are identical with those of the first embodiment.

Thus, even during the registration term, reception of calls via the virtual telephone number can be rejected for a certain period of time in which such calls would cause inconvenience.

As described above, according to the present invention, the centralized management station assigns a virtual telephone number to a first subscriber terminal at the request of the first subscriber terminal, and registers in memory the virtual telephone number in association with connection information on the first subscriber terminal. When a second subscriber terminal initiates a call using the virtual telephone number, the centralized management station refers to the memory, reads out the connection information associated with the virtual telephone number, and establishes connection between the first and second subscriber terminals in accordance with the connection information. Accordingly, a subscriber terminal is promptly permitted to temporarily use a different telephone number without the need for payment of the telephone installation fee.

Specifically, a subscriber has only to send a virtual telephone number registration request from his or her terminal to use a virtual telephone number, and thus can use a virtual telephone number without delay whenever he/she desires. When a virtual telephone number registration request is sent from a subscriber terminal, the exchange per se automatically searches for an idle telephone number, and accordingly, it is not necessary for a subscriber to repeatedly specify a plurality of telephone numbers until an idle telephone number is found or to conjecture an idle telephone number.

A virtual telephone number is available without the need to acquire a telephone subscription right; therefore, where a virtual telephone number is used for only a short period of time, the cost required is low compared with the case where a telephone is newly installed.

Also, in cases where a subscriber is temporarily obliged to receive a telephone call from a person whom the subscriber wishes to leave uninformed of his or her telephone number, he/she can be reached by telephone without letting the person know the original telephone number.

In the exchange, all of the data relating to registered virtual telephone numbers is automatically cleared upon lapse of a predetermined time (e.g., one day), whereby deficiency of resources for virtual telephone numbers due to registration of an excessively large number of virtual telephone numbers can be prevented. Further, there is no need for a subscriber terminal side to specify a virtual telephone number, and therefore, it is possible to prevent the situation where particular virtual telephone numbers that are euphonious and thus easy to remember alone are frequently used, permitting efficient use of virtual telephone numbers.

Also, a subscriber who has registered a virtual telephone number is permitted to set the registration term as desired and also to change the term. This enables a subscriber to keep the same virtual telephone number registered over a desired period of time.

Further, when the term for registration of a virtual telephone number has expired, a corresponding registered subscriber is informed to that effect. This prevents a subscriber from misunderstanding that his or her virtual telephone number is still registered, though in actuality the registration has already been canceled.

A subscriber who has registered a virtual telephone number is also permitted to extend the registration term. This enables a subscriber to register and use the same virtual telephone number longer than an ordinary registration term.

A party making a call by using a virtual telephone number is informed of the name of the subscriber who has registered the virtual telephone number. This prevents calls from being connected to a wrong person after the registration of the virtual telephone number is canceled and the same virtual telephone number is assigned to another subscriber.

Also, even before expiration of the registration term, a registered subscriber can cancel the registration of his/her virtual telephone number when the virtual telephone number is no longer necessary. This permits efficient use of a limited number of virtual telephone numbers.

When a subscriber as a calling party makes a call by using a virtual telephone number, he/she is notified of a basic charge for the call. This permits a calling party to estimate a telephone charge that cannot be reckoned from the virtual telephone number only.

Also, for an incoming call via a virtual telephone number, a special ringing tone is sounded. Thus, when receiving an incoming call, a subscriber who has registered a virtual telephone number can judge whether the incoming call is via the virtual telephone number or via the ordinary telephone number.

Further, a subscriber who has registered a virtual telephone number is permitted to reject reception of calls. Thus, even during the registration term, a subscriber can suspend reception of calls via the virtual telephone number for a certain period of time in which such calls would cause inconvenience.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. An apparatus for permitting temporary use of a telephone number to temporarily enable a subscriber terminal to have telephone communication by using a telephone number other than that assigned thereto, comprising:

virtual telephone number notification means, responsive to a request from a first subscriber terminal to assign thereto a temporary telephone number which is a telephone number permitting temporary use, for assigning a temporary telephone number to the first subscriber terminal and notifying the first subscriber terminal of the assign temporary telephone number;

virtual telephone number registration means for registering the temporary telephone number assigned to the first subscriber terminal in association with connection information on the first subscriber terminal; Call connection means, responsive to a call request from a second subscriber terminal by means of a temporary telephone number, for referring to said virtual telephone number registration means to read out connection information associated with the request temporary telephone number and connecting the second subscriber terminal to a subscriber terminal with which the connection information is associated;

term registration means for registering a registration term specified or changed through the first subscriber terminal, the registration term being a period during which the temporary telephone number is validly assigned to the first subscriber terminal; and notifying means for checking the validity of the temporary telephone number at predetermined intervals with reference to the registration term registered by said term registration means, and notifying, when the registration term has expired, the first subscriber terminal of the expiration of the registration term.

2. The apparatus according to claim 1, wherein said connection information comprises information indicative of subscriber terminal assignment location.

3. The apparatus according to claim 1, further comprising erasing means for erasing, at predetermined intervals of time, information registered by said virtual telephone number registration means.

4. The apparatus according to claim 1, further comprising term registration means for registering a registration term specified or changed by the first subscriber terminal, in association with the temporary telephone number; and erasing means for monitoring the registration term registered by said term registration means and erasing information in such a manner that when the registration term has expired, corresponding information registered by said virtual telephone number registration means is erased by said erasing means.

5. The apparatus according to claim 1, further comprising term updating means, responsive to a request for extension of registration term from the subscriber terminal which has received notification from said notifying means, for updating the corresponding registration term-registered by said term registration means.

6. The apparatus according to claim 1, further comprising cancellation request-responsive erasing means, responsive to a request for cancellation of registration of temporary telephone number from the first subscriber terminal, for erasing information about the first subscriber terminal registered by said virtual telephone number registration means.

7. The apparatus according to claim 1, wherein said call connection means includes ringing tone sending means for sending out a ringing tone specially prepared for call reception via a temporary telephone number, to a receiving-side subscriber terminal with respect to which connection is to be established in accordance with a call request from the second subscriber terminal.

8. The apparatus according to claim 1, wherein:

said virtual telephone number registration means includes refusal registration means, responsive to a request from the first subscriber terminal for temporary refusal of call reception via the temporary telephone number being registered, for registering refusal information in association with the temporary telephone number assigned to the first subscriber terminal, and said call connection means includes rejecting means, responsive to a call request from the second subscriber terminal addressed to the temporary telephone number, for rejecting the call request from the second subscriber terminal to a subscriber terminal with which the connection information is associated if while the said refusal registration means has the active refusal information associated with the requested virtual telephone number.

9. An apparatus for permitting temporary use of a telephone number to temporarily enable a subscriber terminal to have telephone communication by using a telephone number other than that assigned thereto, comprising:

virtual telephone number notification means, responsive to a request from a first subscriber terminal to assign thereto a temporary telephone number which is a telephone number permitting temporary use, for assigning a temporary telephone number to the first subscriber terminal and notifying the first subscriber terminal of the assigned temporary telephone number;

registration means for registering the temporary telephone number assigned to the first subscriber terminal and a basic charge for call, in association with connection information on the first subscriber terminal;

notification means, responsive to a call request from a second subscriber terminal by means of a temporary telephone number, for referring to said registration means and notifying the second subscriber terminal of a basic charge for call associated with the requested temporary telephone number;

call connection means, responsive to a connection request from the second subscriber terminal following notification by said notification means, for referring to said registration means to read out connection information associated with the requested temporary telephone number and connecting the second subscriber terminal to a subscriber terminal with which the connection information is associate;

term registration means for registering a registration term specified or changed through the first subscriber terminal, the registration term being a period during which the temporary telephone number is validly assigned to the first subscriber terminal; and notifying means for checking the validity of the temporary telephone number at predetermined intervals with reference to the registration term registered by said term registration means, and notifying, when the registration term has expired, the first subscriber terminal of the expiration of the registration term.

10. An apparatus for permitting temporary use of a telephone number to temporarily enable a subscriber terminal to have telephone communication by using a telephone number other than that assigned thereto, comprising:

virtual telephone number notification means, responsive to a request from a first subscriber terminal to assign thereto a temporary telephone number which is a telephone number permitting temporary use, for assigning a temporary telephone number to the first subscriber terminal and notifying the first subscriber terminal of the assigned temporary telephone number;

registration means for registering the temporary telephone number assigned to the first subscriber terminal and a basic charge for call, in association with connection information on the first subscriber terminal;

notification means, responsive to a call request from a second subscriber terminal by means of a temporary telephone number, for referring to said registration means and notifying the second subscriber terminal of a basic charge for call associated with the requested temporary telephone number;

call connection means, responsive to a connection request from the second subscriber terminal following notification by said notification means, for referring to said registration means to read out connection information associated with the requested temporary telephone number and connecting the second subscriber terminal to a subscriber terminal with which the connection information is associated;

term registration means for registering a registration term specified or changed through the first subscriber terminal, the registration term being a period during which the temporary telephone number is validly assigned to the first subscriber terminal; and notifying means for checking the validity of the temporary telephone number at predetermined intervals with reference to the registration term registered by said term registration means, and notifying, when the registration term has expired, the first subscriber terminal of the expiration of the registration term.

11. An apparatus for permitting temporary use of a telephone number, comprising:

assigning means, responsive to a request from a subscriber terminal to assign thereto a temporary telephone number, for assigning the subscriber terminal a new temporary telephone number other than a telephone number already assigned thereto;

connection processing means for performing a call connection process by using the temporary telephone number during a connection process for connecting a call to the subscriber terminal;

term registration means for registering a registration term specified or changed through the first subscriber terminal, the registration term being a period during which the temporary telephone number is validly assigned to the first subscriber terminal; and notifying means for checking the validity of the temporary telephone number at predetermined intervals with reference to the registration term registered by said term registration means, and notifying, when the registration term has expired, the first subscriber terminal of the expiration of the registration term.

12. A method for use in an apparatus for permitting temporary use of a telephone number to temporarily enable a subscriber terminal to have telephone communication by using a telephone number other than that assigned thereto, comprising the steps of:

receiving a request from a subscriber terminal to assign thereto a temporary telephone number, and assigning the subscriber terminal a new temporary telephone number other than a telephone already assigned thereto; and performing a call connection process by using the temporary telephone number when a connection process for connecting a call to the subscriber terminal is requested;

registering a registration term specified or changed through the subscriber terminal, the registration term being a period during which the temporary telephone number is validly assigned to the subscriber terminal; and checking the validity of the temporary telephone number at predetermined intervals with reference to the registered registration term and notifying, when the registration term has expired, the subscriber terminal of the expiration of the registration term.

\* \* \* \* \*

UNITED STATES PATENT AND TRADEMARK OFFICE
CERTIFICATE OF CORRECTION

PATENT NO. : 6,327,353 B1
DATED : December 4, 2001
INVENTOR(S) : Yohi Fukuzawa

It is certified that error appears in the above-identified patent and that said Letters Patent is hereby corrected as shown below:

<u>Column 15,</u>
Lines 51-66, should read:
8. The apparatus according to claim 1, wherein:

said virtual telephone number registration means includes refusal registration means, responsive to a request from the first subscriber terminal for temporary refusal of call reception via the temporary telephone number being registered, for registering refusal information in association with the temporary telephone number assigned to the first subscriber terminal, and
    said call connection means includes rejecting means, responsive to a call request from the second subscriber terminal addressed to the temporary telephone number, for rejecting the call request from the second subscriber terminal while the refusal registration means has the active refusal information associated with the requested temporary telephone number.

Signed and Sealed this

Eighth Day of June, 2004

JON W. DUDAS
*Acting Director of the United States Patent and Trademark Office*